(12) United States Patent
Ha et al.

(10) Patent No.: US 9,249,038 B2
(45) Date of Patent: Feb. 2, 2016

(54) WATER PURIFIER

(75) Inventors: Younghoon Ha, Busan (KR); Kobong Choi, Gimhae-si (KR); Jonghun Park, Gwangmyeong-si (KR); Ho Seon Choi, Seocho-gu (KR); Joonho Jang, Changwon-si (KR); Sangho Kim, Gimhae-si (KR); Kang Hyun Lee, Busan (KR); Kyu Seong Choi, Seoul (KR); Je Wook Jeon, Gimhae-si (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 13/410,934

(22) Filed: Mar. 2, 2012

(65) Prior Publication Data

US 2012/0222999 A1  Sep. 6, 2012

(30) Foreign Application Priority Data

| Mar. 3, 2011 | (KR) | 10-2011-0018932 |
|---|---|---|
| Jul. 8, 2011 | (KR) | 10-2011-0067794 |
| Jul. 8, 2011 | (KR) | 10-2011-0068121 |
| Jul. 8, 2011 | (KR) | 10-2011-0068122 |
| Jul. 8, 2011 | (KR) | 10-2011-0068127 |
| Jul. 8, 2011 | (KR) | 10-2011-0068134 |
| Jul. 8, 2011 | (KR) | 10-2011-0068137 |
| Feb. 21, 2012 | (KR) | 10-2012-0017226 |
| Feb. 21, 2012 | (KR) | 10-2012-0017272 |
| Feb. 21, 2012 | (KR) | 10-2012-0017288 |

(51) Int. Cl.
| B01D 35/00 | (2006.01) |
|---|---|
| C02F 1/00 | (2006.01) |
| E03B 11/00 | (2006.01) |
| C02F 9/00 | (2006.01) |
| B01D 35/027 | (2006.01) |
| E03B 11/04 | (2006.01) |

(52) U.S. Cl.
CPC ............... *C02F 9/005* (2013.01); *C02F 1/008* (2013.01); *B01D 35/027* (2013.01); *C02F 1/001* (2013.01); *C02F 2201/004* (2013.01); *C02F 2201/005* (2013.01); *C02F 2201/006* (2013.01); *C02F 2209/02* (2013.01); *E03B 11/04* (2013.01)

(58) Field of Classification Search
CPC ........... B01D 2313/12; B01D 2313/50; B01D 2311/106
See application file for complete search history.

(56) References Cited

U.S. PATENT DOCUMENTS

| 3,848,627 | A | * | 11/1974 | Page | 137/392 |
|---|---|---|---|---|---|
| 3,923,662 | A | * | 12/1975 | O'Brien | 210/251 |
| 4,045,293 | A | * | 8/1977 | Cooksley | 203/10 |
| 4,152,262 | A | * | 5/1979 | Rose | 210/136 |
| 4,193,241 | A | * | 3/1980 | Jensen et al. | 52/405.4 |
| 4,194,385 | A | * | 3/1980 | November | 73/1.06 |
| 4,409,962 | A | * | 10/1983 | Riley | 126/639 |
| 4,627,845 | A | * | 12/1986 | DeMotte | 604/295 |

(Continued)

FOREIGN PATENT DOCUMENTS

| JP | 2000-301138 A | 10/2000 |
|---|---|---|
| KR | 10-1998-0010294 A | 4/1998 |

(Continued)

*Primary Examiner* — Nam Nguyen
*Assistant Examiner* — Richard Gurtowski
(74) *Attorney, Agent, or Firm* — Dentons US LLP

(57) ABSTRACT

A water purifier includes a filter part to filter water, a storage part to store the water filtered by the filter part, and a separation unit to partition a space within the storage part into a plurality of spaces. A contact part is disposed between an inner surface of the storage part and the separation unit.

46 Claims, 26 Drawing Sheets

(56) References Cited

U.S. PATENT DOCUMENTS

| | | | |
|---|---|---|---|
| 4,651,862 A * | 3/1987 | Greenfield, Jr. | 194/344 |
| 4,958,747 A * | 9/1990 | Sheets | 222/67 |
| 5,049,270 A * | 9/1991 | Carrano et al. | 210/248 |
| 5,573,142 A * | 11/1996 | Morellato et al. | 222/129.1 |
| 5,671,113 A * | 9/1997 | Knepler | 361/103 |
| 5,823,007 A * | 10/1998 | Chang | 62/397 |
| 2005/0139552 A1* | 6/2005 | Forsberg et al. | 210/748 |
| 2008/0016866 A1* | 1/2008 | Mohr | 60/649 |

FOREIGN PATENT DOCUMENTS

| | | |
|---|---|---|
| KR | 20-0117910 Y1 | 4/1998 |
| KR | 20-1998-0063442 | 11/1998 |
| KR | 2019990002332 U | 1/1999 |
| KR | 1019990035269 A | 5/1999 |
| KR | 20-2000-0001647 U | 1/2000 |
| KR | 20-0228417 Y1 | 6/2001 |
| KR | 10-2001-0096444 A | 11/2001 |
| KR | 1020040065545 A | 7/2004 |
| KR | 1020050029347 A | 3/2005 |
| KR | 10-2006-0119361 A | 11/2006 |
| KR | 10-0735911 B1 | 6/2007 |
| KR | 20-0439061 Y1 | 3/2008 |
| KR | 10-0821372 B1 | 4/2008 |
| KR | 10-0830684 B1 | 5/2008 |
| KR | 100852342 B1 | 8/2008 |
| KR | 100921792 B1 | 10/2009 |
| KR | 1020100047529 A | 5/2010 |
| KR | 1020100060920 A | 6/2010 |
| KR | 10-2010-0137747 A | 12/2010 |
| KR | 10-1006860 B1 | 1/2011 |
| KR | 10-2011-0026842 A | 3/2011 |
| KR | 101098191 B1 | 12/2011 |

* cited by examiner

WATER PURIFIER

CROSS-REFERENCE TO RELATED APPLICATIONS

This application claims the benefit of Korean Patent Application Nos. 10-2011-0018932 filed on Mar. 3, 2011, 10-2011-0068121 filed on Jul. 8, 2011, 10-2011-0068137 filed on Jul. 8, 2011; 10-2011-0068127 filed on Jul. 8, 2011; 10-2011-0068122 filed on Jul. 8, 2011; 10-2011-0067794 filed on Jul. 8, 2011; 10-2011-0068134 filed on Jul. 8, 2011; 10-2012-0017226 filed on Feb. 21, 2012; 10-2012-0017272 filed on Feb. 21, 2012 and 10-2012-0017288 filed on Feb. 21, 2012, which are hereby incorporated by reference for all purposes as if fully set forth herein.

BACKGROUND

The present disclosure relates to a water purifier.

Water purifiers are apparatuses which are connected to a water supply to purify supplied water.

Such a water purifier includes one or more filters and a water storage tank for storing purified water. Depending on the type of purifier, the water purifier may further include a hot water storage tank for storing hot water or a cool water storage tank for storing cool water, or the hot water storage tank and the cool water storage tank. In the case where the water purifier includes the hot water storage tank, a heater for heating purified water may be provided. In the case where the water purifier includes the cool water storage tank, a cooler for cooling purified water may be provided.

SUMMARY

Embodiments provide a water purifier.

In one embodiment, a water purifier includes: a filter part to filter water; a storage part to store the water filtered by the filter part; and a separation unit to partition a space within the storage part into a plurality of spaces, wherein a contact part is disposed between an inner surface of the storage part and the separation unit.

In another embodiment, a water purifier includes: a filter part to filter water; a storage part in which the water filtered by the filter part is stored, the storage part including a purified water storage tank and a cool water storage tank; a first discharge part disposed under the purified water storage tank so that water within the purified water storage tank is discharged therein; and a second discharge part disposed under the cool water storage tank so that water within the cool water storage tank is discharged therein, wherein the purified water storage tank and the cool water storage tank have storage capacities different from each other.

In further another embodiment, a water purifier includes: a filter part to filter water; a storage part to store the water filtered by the filter part; a separation unit to partition a space within the storage part into a plurality of spaces; and an external insulation part surrounding the storage part to thermally insulate the storage part from the outside, wherein the external insulation part surrounding an upper side of the storage part has a thickness different from that of the external insulation part surrounding a lower side of the storage part.

The details of one or more embodiments are set forth in the accompanying drawings and the description below. Other features will be apparent from the description and drawings, and from the claims.

DETAILED DESCRIPTION OF THE EMBODIMENTS

Figure 1:
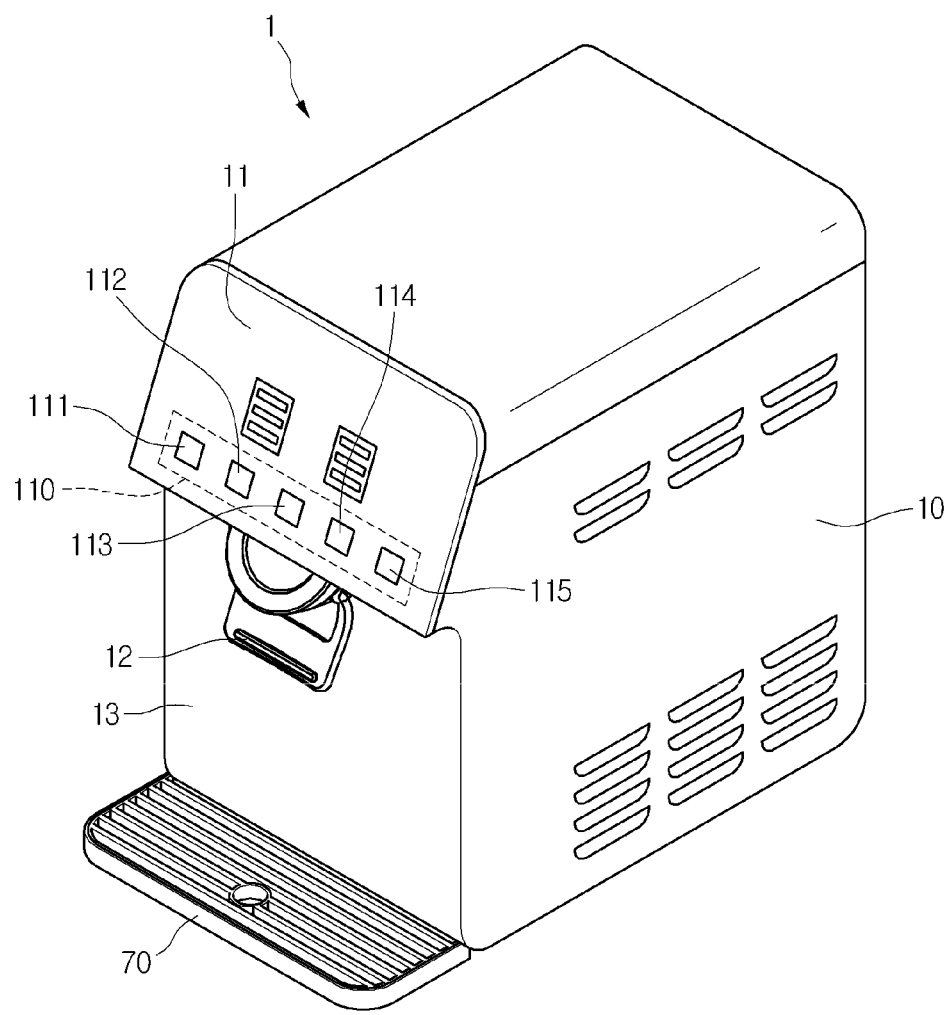
FIG. 1 is perspective view of a water purifier according to an embodiment.

Hereinafter, exemplary embodiments of the present disclosure will be described with reference to the accompanying drawings. Regarding the reference numerals assigned to the elements in the drawings, it should be noted that the same elements may be designated by the same reference numerals, wherever possible, even though they are shown in different drawings. Also, in the description of embodiments, detailed description of well-known related structures or functions may be omitted.

Also, in the description of embodiments, terms such as first, second, A, B, (a), (b) or the like may be used herein when describing components of the present disclosure. Each of these terminologies is not used to define an essence, order or sequence of a corresponding component but is used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
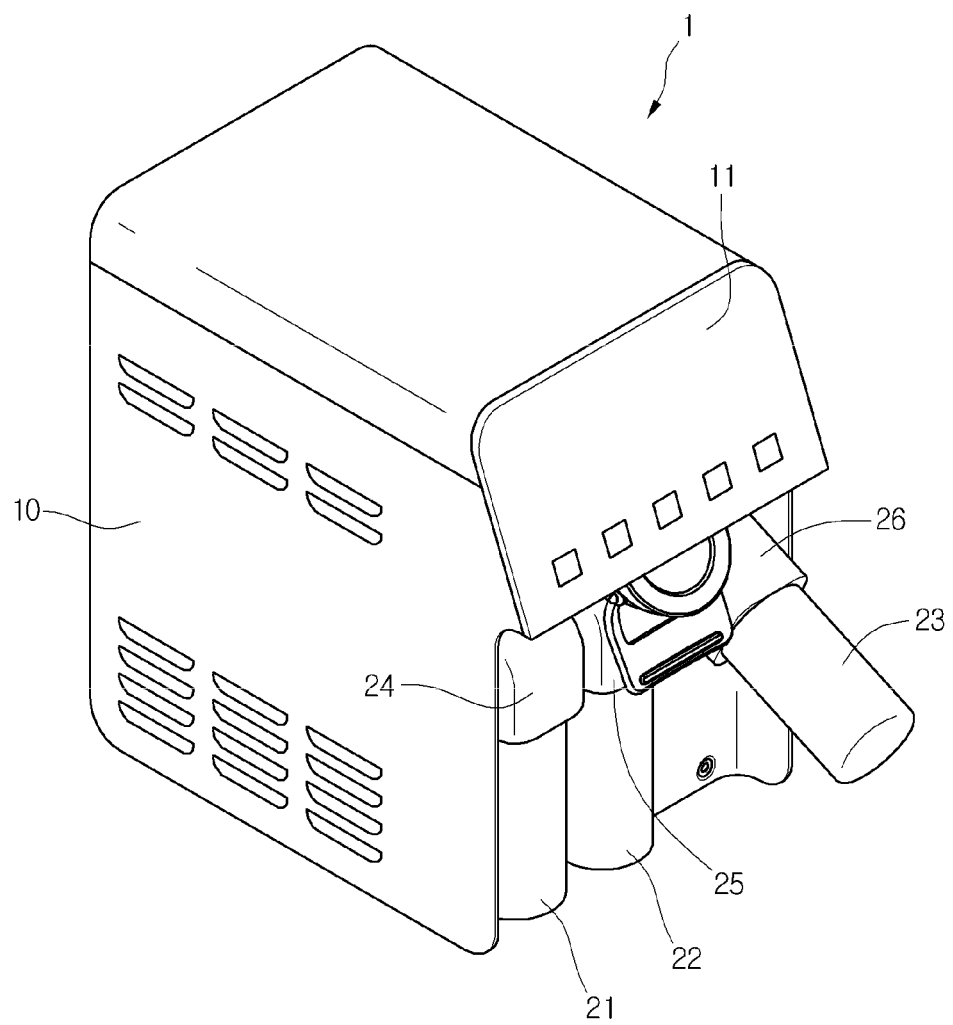
FIG. 2 is a perspective view of a state in which a filter cover is separated from the water purifier of FIG. 1.

FIG. 1 is perspective view of a water purifier according to an embodiment. FIG. 2 is a perspective view of a state in which a filter cover is separated from the water purifier of FIG. 1.

Referring to FIGS. 1 and 2, a water purifier 1 according to the current embodiment includes a main body 10 including at least one filter therein, a filter cover 13 coupled to the main body 10 to cover the filter, and a water bucket 70 separably coupled to the main body 10 to receive residual water dropping down when the water is discharged from a dispenser.

A control panel 11 is disposed on a front portion of the main body 10. A manipulation part 110 for selecting functions is disposed on the control panel 11. A manipulation lever 12 manipulated for dispensing water is disposed at a front side of the main body 10.

The filter cover 13 is separably coupled to a front side of the main body 10.

According to the current embodiment, since the filter cover 13 is separably coupled to the front side of the main body 10, the filter cover 13 may be easily separated from the front side of the main body 10, and also, at least one filter may be easily mounted or separated.

In the current embodiment, the water purifier including three filters will be described as an example. The water purifier 1 includes a first filter 21, a second filter 22, and a third filter 23. The current embodiment is not limited to the kind and number of filters.

Also, the water purifier 1 includes a first filter holder 24 on which the first filter 21 is mounted, a second filter holder 25 on which the second filter is mounted, and a third filter holder 26 on which the third filter is mounted. The filters 21, 22, and 23 may be rotated together with the filter holders 24, 25, 26, respectively, in a state where each of the filters 21, 22, and 23 is mounted on each of the filter holders 24, 25, and 26.

The manipulation part 110 may include a plurality of buttons. The plurality of buttons may include a hot water button 112 for selecting a hot water discharge function, a purified water button 113 for selecting a purified water discharge function, and a cool water button 114 for selecting a cool water discharge function.

In the current embodiment, when the hot water button 112 is pushed for a predetermined time, a hot water mode may be selected or released. The hot water mode relates to an operation of a heater (see reference numeral 339 of FIG. 3). When the hot water mode is selected, the heater is operated. When the hot water mode is released, the operation of the heater is stopped. The hot water discharge function denotes a function for discharging hot water stored in a hot water storage tank.

The control panel 11 may further include a light emitting part or display part for informing whether each of the buttons 112, 113, and 114 is selected. A control part 60 may control the display part or light emitting part so that the light emitting part or the display part is maintained in a former state until the other button is selected in a state where one of the hot water button 112, the purified water button 113, and the cool water button 114 is selected.

In the current embodiment, when the cool water button 114 is pushed for a predetermined time, a cool water mode may be selected or released. The cool water mode relates to an operation of a cooler (not shown). When the cool water mode is selected, the cooler is operated. When the cool water mode is released, the operation of the cooler is stopped. The cool water discharge function denotes a function for discharging cool water stored in a cool water storage tank.

When the hot water button 112 is pushed and the manipulation lever 12 is pressed in the state where the hot water mode is selected, hot water may be discharged. When the cool water button 114 is pushed and the manipulation lever 12 is pressed in the state where the cool water mode is selected, cool water may be discharged. Alternatively, when the manipulation lever 12 is pressed in the state where the cool water mode is selected, cool water may be discharged. In the case, the cool water discharge function should be set to a basic discharge function. When the purified water button 113 is pushed and the manipulation lever 12 is pressed, purified water may be discharged.

Also, the plurality of buttons may further include a lock button for locking the hot water discharge function and a continuous button 115 for continuously discharging the cool water or purified water for a predetermined time or by a predetermined amount. The lock button 111 may lock the hot water discharge function, but does not release the hot water mode. Thus, even though the hot water button 112 is pushed and the manipulation lever 12 is pressed in a state where the lock function is selected using the lock button 111, hot water is not discharged. On the other hand, when the lock function is released using the lock button 111, hot water may be discharged.

Hereinafter, a structure of the water purifier according to the current embodiment will be described in detail.

Figure 3:
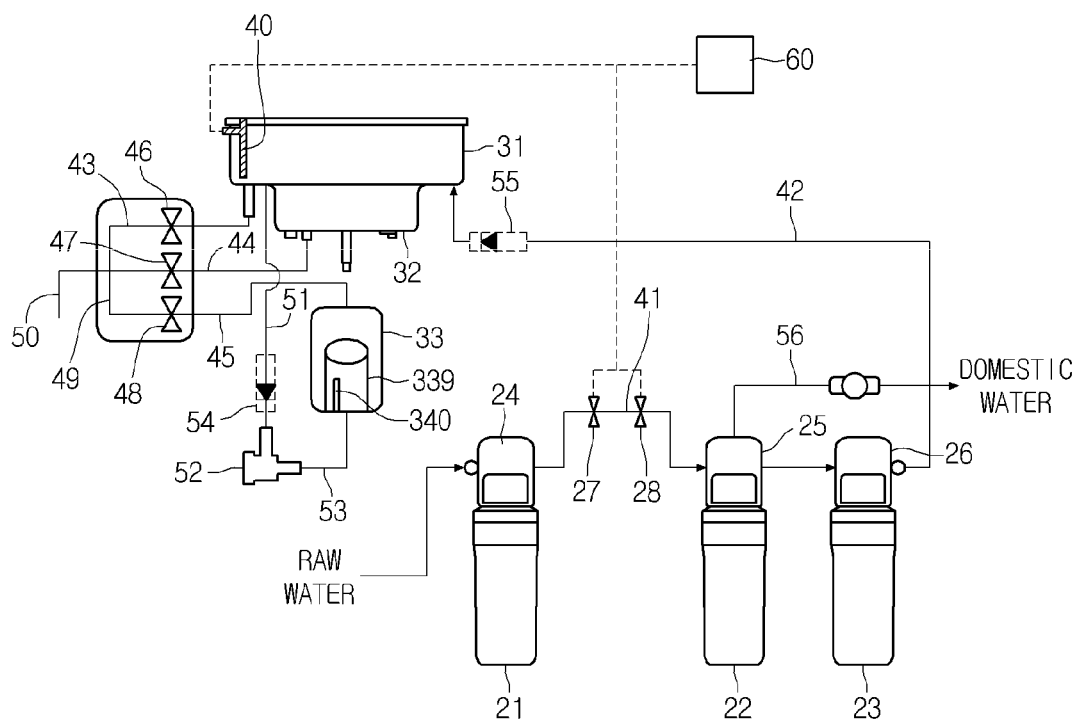
FIG. 3 is a schematic diagram illustrating a water tube system of a water purifier according to an embodiment.

FIG. 3 is a schematic diagram illustrating a water tube system of a water purifier according to an embodiment.

Referring to FIG. 3, the water purifier 1 may include a purified water tube 42 through which purified water filtered by the plurality of filters 21, 22, and 23 (that may be called a filter part) flows, a purified water storage tank connected to the purified water tube 42 to store the purified water, a cool water storage tank 32 for storing cool water, and a hot water storage tank 33 for hot water.

Also, the water purifier 1 may include a plurality of flow rate adjustment valves 27 and 28 disposed in a tube 41 connecting the first filter 21 to the second filter 22 and a control part 60 controlling the flow rate adjustment valves 27 and 28. The plurality of flow rate adjustment valves 27 and 28 may be operated on the basis of a water level detected by a water level sensor 40 disposed in the purified water storage tank 31.

For example, when a low water level is detected during the discharging of the cool water or purified water or after the cool water or purified water is completely discharged, the control part 60 opens the plurality of flow rate adjustment valves 27 and 28 to supply water filtered by the plurality of filters 21, 22, and 23 into the purified water storage tank 31.

A check valve 55 for preventing the water within the purified water storage tank 31 from flowing toward the third filter 23 may be disposed in the purified water tube 42.

The purified water storage tank 31 and the cool water storage tank 32 may be integrated with each other. The purified water storage tank 31 and the cool water storage tank 32 which are integrated with each other may be commonly called a storage part. The cool water storage tank 32 may be disposed under the purified water storage tank 31. Thus, the purified water introduced into the purified water storage tank 31 may be supplied to the cool water storage tank 32. The purified water supplied to the cool water storage tank 32 may be cooled by a cooler. An operation of the cooler may be controlled according to a temperature of cool water. A temperature sensor (see reference numeral 324 of FIG. 17) for detecting a temperature of cool water may be disposed in the cool water storage tank 32.

A first connection tube 51 through which water to be supplied to the hot water storage tank 33 flows is connected to the purified water storage tank 31. The first connection tube 51 is connected to a drain connector 52. A check valve 54 for allowing the purified water within the purified water storage tank 31 to flow only toward the drain connector 52 may be disposed in the first connection tube 51.

The drain connector 52 is connected to the hot water storage tank 33 by a second connection tube 53. A drain (not shown) may be disposed in the drain connector 52. The drain may be opened or closed by a check valve (not shown). The check valve opens the drain when a drain hose (not shown) is inserted into the drain connector 52 from the outside. Thus, in the state where the drain is closed, purified water within the purified water storage tank 31 may flow into the hot water storage tank 33 through the first connection tube 51, the drain connector 52, and the second connection tube 53. The purified water flowing into the hot water storage tank 33 may be heated by the heater. An operation of the heater may be controlled according to a temperature of hot water. The temperature sensor 340 for detecting a temperature of hot water may be disposed in the hot water storage tank 33.

On the other hand, when the drain hose is connected to the drain connector 52, the drain may be opened. Thus, water within the hot water storage tank 33 may be drained into the drain hose through the drain via the second connection tube 53.

The water purifier 1 may include a purified water discharge tube 43 (that may be called a first discharge part) through which purified water within the purified water storage tank 31 is discharged, a cool water discharge tube 44 (that may be called a second discharge part) through which cool water within the cool water storage tank 32 is discharged, a hot water discharge tube 45 through which hot water within the hot water storage tank 33 is discharged, a purified water valve 46 disposed in the purified water discharge tube 43, a cool water valve 44 disposed in the cool water discharge tube 44, and a hot water valve 48 disposed in the hot water discharge tube 45.

The purified water valve 46 adjusts a flow of purified water in the purified water discharge tube 43. The cool water valve 47 adjusts a flow of cool water in the cool water discharge tube 44. The hot water valve 48 adjusts a flow of hot water in the hot water discharge tube 45.

The purified water discharge tube 43, the cool water discharge tube 44, and the hot water discharge tube 45 may be connected to a common discharge tube 49. A dispenser 50 is connected to the common discharge tube 49. That is, in the current embodiment, purified water, cool water, or hot water may be selectively dispensed using the single manipulation lever 12 and the dispenser 50. Thus, the water purifier 1 may be simplified in structure, and an outer appearance of the water purifier 1 may be smart.

When the cool water button 114 is selected, the control part 60 turns the cool water valve 47 on so that cool water within the cool water storage tank 32 is discharged to the common discharge tube 49. Here, the purified water valve 46 and the hot water valve 48 are turned off.

Also, when the purified water button 113 is selected, the control part 60 turns the purified water valve 46 on so that purified water within the purified water storage tank 31 is discharged to the common discharge tube 49. Here, the cool water valve 47 and the hot water valve 48 are turned off.

Also, when the hot water button 112 is selected, the control part 60 turns the hot water valve 48 on so that hot water within the hot water storage tank 33 is discharged to the common discharge tube 49. Here, the cool water valve 47 and the purified water valve 48 are turned off.

Although the valves 46, 47, and 48 are respectively disposed in the discharge tubes 43, 44, and 45 in the current embodiment, the present disclosure is not limited thereto. For example, a flow of purified water, hot water, or cool water may be adjusted by a common valve (e.g., a four-way valve). In this case, the hot water discharge tube 45, the cool water discharge tube 44, the purified water discharge tube 43, and the common discharge tube 49 may be connected to the common valve.

For example, when the cool water button 114 is selected, the control part 60 may control the common valve so that cool water within the cool water storage tank 32 is discharged to the common discharge tube 49. Also, when the purified water button 113 is selected, the control part 60 may control the common valve so that cool water within the purified water storage tank 31 is discharged to the common discharge tube 49.

If a temperature detected by the temperature sensor 324 for detecting a temperature of the cool water storage tank does not satisfy a reference temperature during the discharging of the cool water within the cool water storage tank 32 or after the cool water is completely discharged, the control part 60 turns the cooler on.

Also, if a temperature detected by the temperature sensor 340 for detecting a temperature of the hot water storage tank 33 does not satisfy a reference temperature during the discharging of the hot water within the hot water storage tank 33 or after the hot water is completely discharged, the control part 60 turns the heater on.

A domestic water tube 56 through which domestic water is discharged may be connected to a second filter head 25 to which the second filter 22 is connected.

Figure 4:
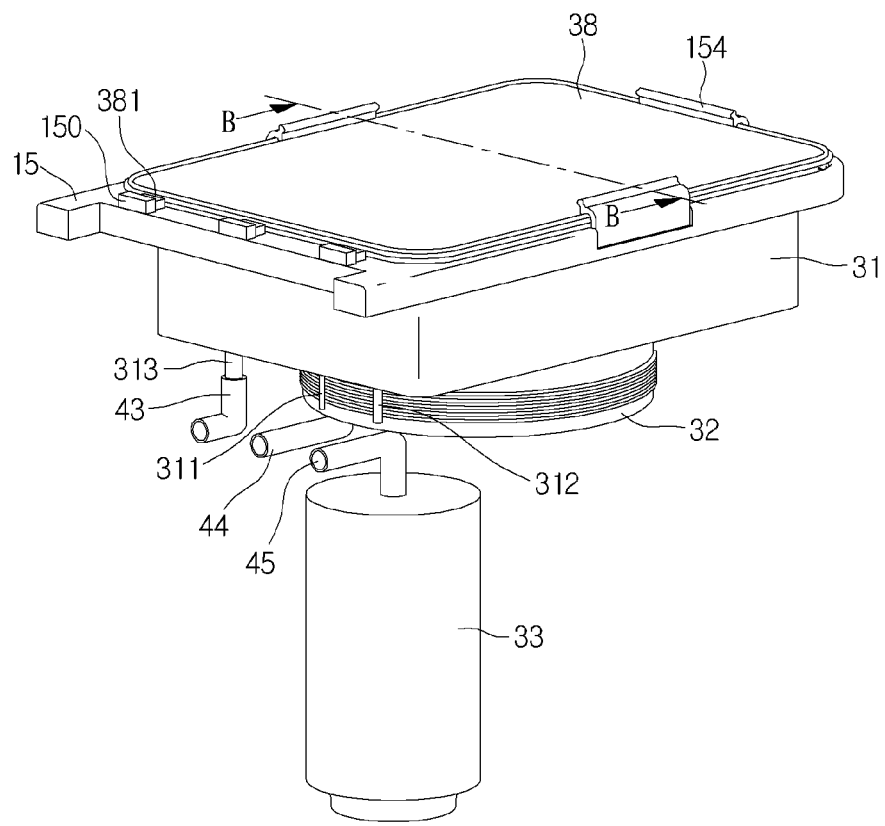
FIG. 4 is a schematic view illustrating an internal arrangement of the water purifier according to an embodiment.
Figure 5:
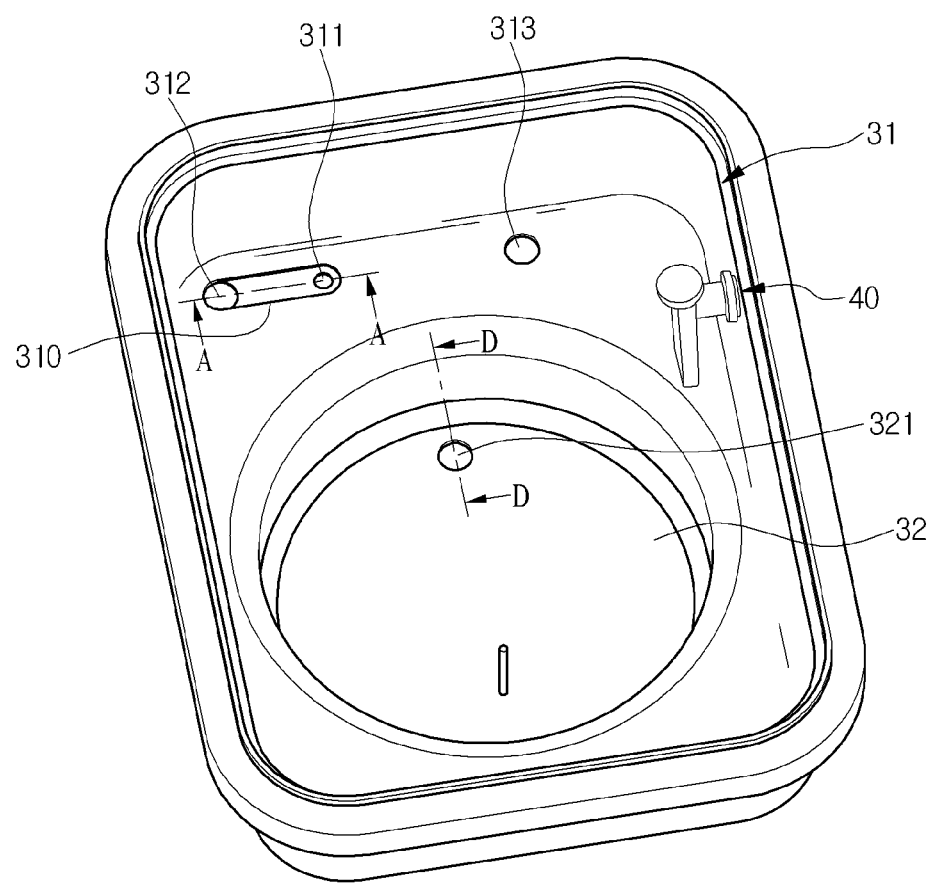
FIG. 5 is a perspective view of a purified water storage tank and a cool water storage tank according to an embodiment.
Figure 6:
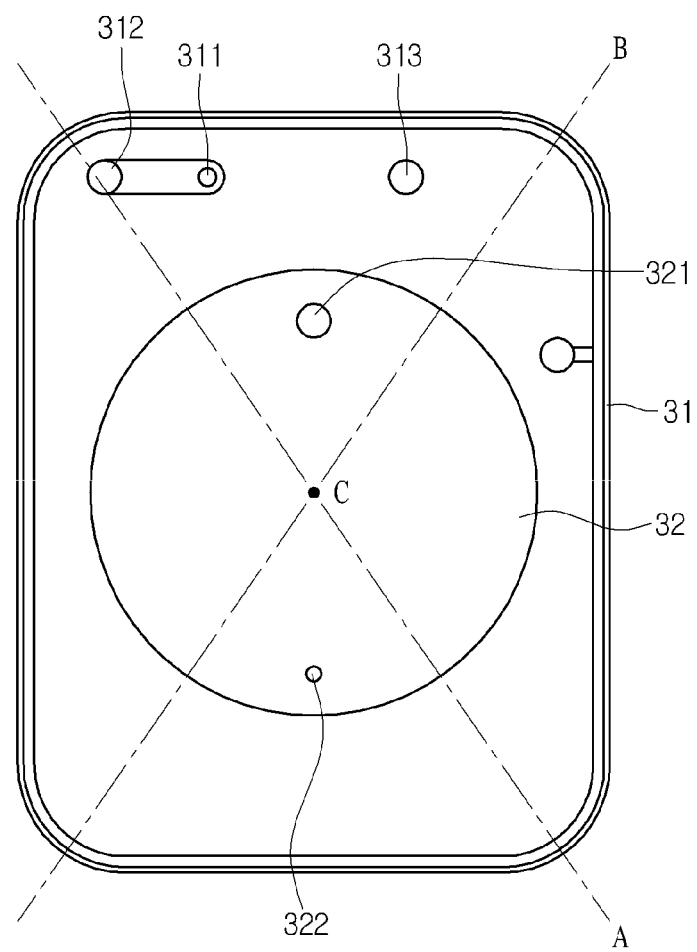
FIG. 6 is a plan view of the purified water storage tank according to an embodiment.
Figure 7:
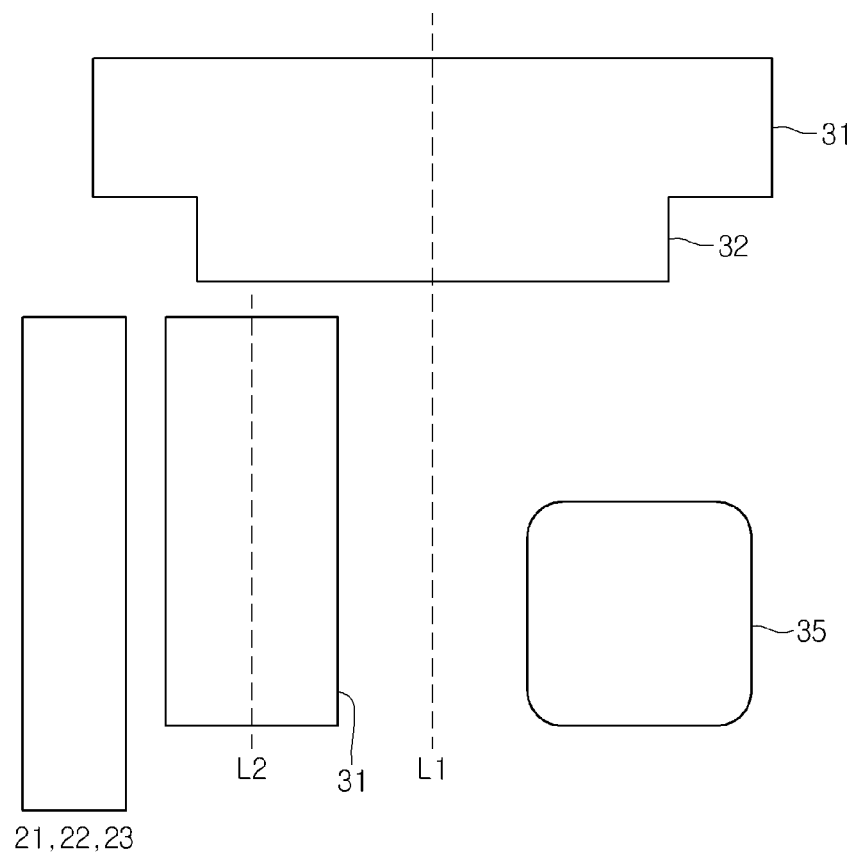
FIG. 7 is a view illustrating an arrangement relationship among the purified water storage tank, the cool water storage tank, and a hot water storage tank.
Figure 8:
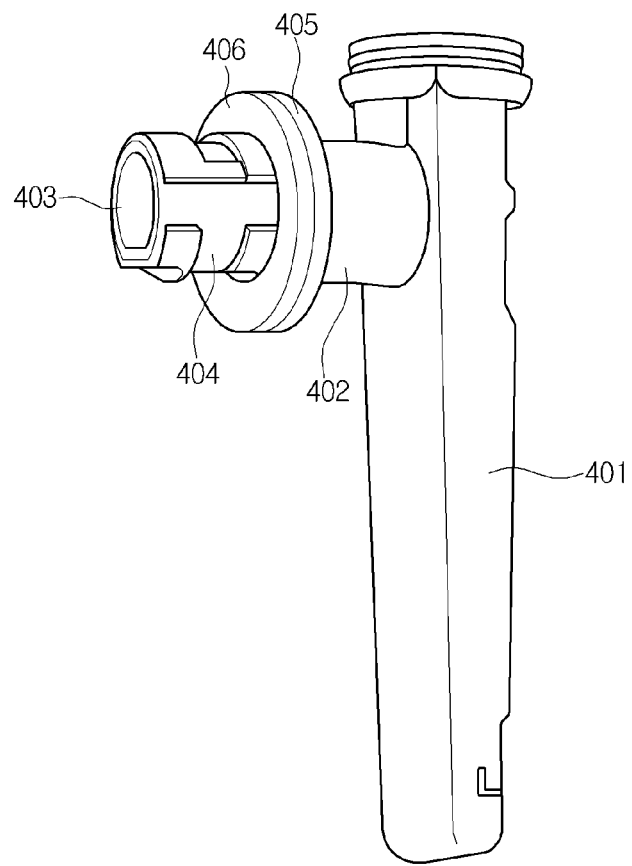
FIG. 8 is a perspective view of a water level sensor according to an embodiment.

FIG. 4 is a schematic view illustrating an internal arrangement of the water purifier according to an embodiment. FIG. 5 is a perspective view of the purified water storage tank and the cool water storage tank according to an embodiment. FIG. 6 is a plan view of the purified water storage tank according to an embodiment. FIG. 7 is a view illustrating an arrangement relationship among the purified water storage tank, the cool water storage tank, and the hot water storage tank. FIG. 8 illustrates a view of the water purifier when viewed from a lateral side.

Referring to FIGS. 3 to 7, the purified water storage tank 31 and the cool water storage tank 32 may be integrated with each other. The cool water storage tank 32 is disposed under the purified water storage tank 31. That is, a bottom surface of the purified water storage tank 31 may be recessed to form the cool water storage tank 32. Also, the hot water storage tank 33 may be disposed under the cool water storage tank 32. The purified water storage tank 31 may be seated on an upper frame 15 disposed inside the main body 10. Also, an upper side of the purified water storage tank 31 may be covered by a cover 38. The water level sensor 40 may be coupled to the purified water storage tank 31.

In the current embodiment, the purified water storage tank 31 and the cool water storage tank 32 may have shapes different from each other. For example, the purified water storage tank 31 may have a hexahedron or rectangular parallelepiped shape. Also, the cool water storage tank 32 may have a cylindrical shape.

Thus, the purified water storage tank 31 and the cool water storage tank 32 may have horizontal sectional shapes different from each other. That is, the horizontal section of the purified water storage tank 31 may have a first form (a square shape), and the horizontal section of the cool water storage tank 32 may have a second form (a circular shape). Here, the first form may have a rectangular shape or a square shape.

Here, the purified water storage tank 31 may not have the perfect rectangular or square shape in horizontal section. For convenience of manufacturing, four vertexes of the purified water storage tank 31 may be rounded. In the current embodiment, the perfect rectangular shape or the rounded rectangular shape of the four vertexes may be commonly called a rectangular shape. Also, in the current embodiment, the square rectangular shape or the rounded square shape of the four vertexes may be commonly called a square shape.

Referring to FIG. 6, an intersection C of two diagonal lines A and B connecting the vertexes facing each other in the purified water storage tank 31 may be disposed within a region of the cool water storage tank 32. Specifically, the intersection C may be spaced from a wall defining an outer appearance of the cool water storage tank 32.

According to the current embodiment, since the purified water storage tank 31 has the rectangular shape in horizontal section, an unnecessary space within the water purifier 1 may be utilized, and thus capacity of the purified water storage tank 31 may be increased.

Also, the intersection C may coincide with a center of the cool water storage tank 32. In this case, the purified water storage tank 31 and the cool water storage tank 32 may be easily manufactured.

For example, the hot water storage tank 33 may have a cylindrical shape. A portion of the hot water storage tank 33 may vertically overlap with the cool water storage tank 32. Alternatively, the whole hot water storage tank 33 may vertically overlap with the cool water storage tank 32. A center line L2 of the hot water storage tank 33 may be disposed at a front side of a center line L1 of the cool water storage tank 32. In the current embodiment, the front side denotes a direction facing a front surface of the water purifier 1.

The filters 21, 22, and 23 are disposed at a front side of the hot water storage tank 33. Here, the filters 21, 22, and 23 may be disposed in a region between the dispenser 50 and the hot water storage tank 33. At least a portion of the filters 21, 22, and 23 vertically overlaps the purified water storage tank 31.

A compressor 35 constituting the cooler is disposed at a rear side of the hot water storage tank 33. Here, the compressor 35 may be disposed at a rear side of the center line L1 of the cool water storage tank 32. The compressor 35 vertically overlaps with the cool water storage tank 32 and the purified water storage tank 31.

A purified water introduction part 311 through which purified water is introduced, a hot water storage tank discharge part 312 (that may be called a third discharge part) for discharging the purified water within the purified water storage tank 31 into the hot water storage tank 33, a purified water discharge part 313 (that may be called a first discharge part) through which the purified water is discharged to dispense the purified water within the purified water storage tank 31 are disposed in a bottom surface of the purified water storage tank 31.

Also, the purified water tube 42 is connected to the purified water introduction part 311. The first connection tube 51 is connected to the hot water storage tank discharge part 312. The purified water discharge tube 43 is connected to the purified water discharge part 313. That is, the purified water tube 42, the purified water discharge tube, and the first connection tube 51 may be connected to a lower portion of the purified water storage tank 31.

A cool water discharge part 321 (that may be called a second discharge part) through which cool water is discharged is disposed in a bottom surface of the cool water storage part 32. The cool water discharge tube 44 is connected to the cool water discharge part 321. That is, the cool water discharge tube 44 may be connected to a lower portion of the cool water storage tank 32. The hot water discharge tube 45 may be connected to an upper portion of the hot water storage tank 33.

The purified water introduction part 311, the hot water storage tank discharge part 312, and the purified water discharge part 313 may be disposed on a straight line. The structure in which the purified water introduction part 311, the hot water storage tank discharge part 312, and the purified water discharge part 313 are disposed on the straight line may include all cases in which centers of the purified water introduction part 311, the hot water storage tank discharge part 312, and the purified water discharge part 313 are disposed on a straight line and cases in which centers of the purified water introduction part 311, the hot water storage tank discharge part 312, and the purified water discharge part 313 are not disposed on a straight line.

That is, even though the centers of the purified water introduction part 311, the hot water storage tank discharge part 312, and the purified water discharge part 313 are not disposed on the straight line, the purified water introduction part 311, the hot water storage tank discharge part 312, and the purified water discharge part 313 may be disposed on the straight line.

Also, the purified water introduction part 311, the hot water storage tank discharge part 312, and the purified water discharge part 313 may be disposed between the cool water discharge part 321 and the dispenser 50. That is, the purified water introduction part 311, the hot water storage tank discharge part 312, and the purified water discharge part 313 may be disposed at a front side of the cool water discharge part 321. Specifically, the purified water introduction part 311, the hot water storage tank discharge part 312, and the purified water discharge part 313 may be disposed between the cool water storage tank 32 and the dispenser 50.

In the current embodiment, since the plurality of filters 21, 22, and 23 and the dispenser 50 are disposed at a front side of the water purifier 1, when the purified water introduction part 311 and the purified water discharge part 313 are disposed between the cool water discharge part 321 and the dispenser 50, each of the purified water tube 42 and the purified water discharge tube 43 may be reduced in length.

Also, since the center line L2 of the hot water storage tank 33 is defined at the front side of the center line L1 of the cool water storage tank 33, when the hot water storage tank discharge part 312 is disposed at a front side of the cool water discharge part 321, the first connection tube 51 may be reduced in length.

Although the purified water introduction part 311, the hot water storage tank discharge part 312, and the purified water discharge part 313 are disposed in the bottom surface of the purified water storage tank 31 in the current embodiment, the present disclosure is not limited thereto. For example, at least one of the purified water introduction part 311, the hot water storage tank discharge part 312, and the purified water discharge part 313 may be disposed in a side surface of the purified water storage tank 31. Alternatively, at least one of the purified water introduction part 311, the hot water storage tank discharge part 312, and the purified water discharge part 313 may be disposed on the bottom surface of the purified water storage tank 31, and the rest of the purified water introduction part 311, the hot water storage tank discharge part 312, and the purified water discharge part 313 may be disposed on the side surface of the purified water storage tank 31.

Figure 9:
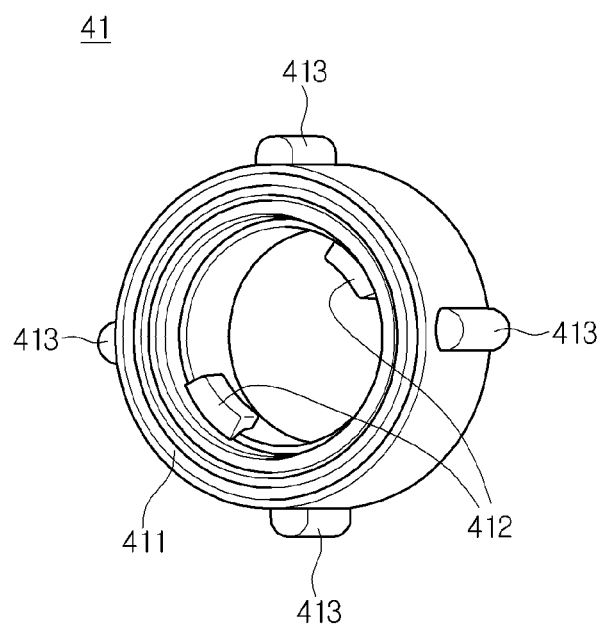
FIG. 9 is a perspective view of a coupling device according to an embodiment.

FIG. 8 is a perspective view of a water level sensor according to an embodiment. FIG. 9 is a perspective view of a coupling device according to an embodiment.

Referring to FIGS. 5, 8, and 9, the water level sensor 40 according to the current embodiment includes a sensor part 401. The sensor part 401 may include one or more sensors for detecting a change in capacitance and a sensor housing surrounding the sensors.

Since a permittivity difference between water and air is about 80 times, a change in capacitance may occur in the case where water or air is filled in the same space.

The sensors may detect a change in capacitance. When water contacts the sensor part 401, the sensor part 401 may measure a change in capacitance to detect a water level within the purified water storage tank 31. The sensor part 401 may include a plurality of sensors. Thus, a water level may be divisionally measured according to the number of sensors.

A coupling part 402 is disposed on a side of the sensor part 401. The water level sensor 40 may be coupled to the purified water storage tank 31 by inserting the coupling part 402 of the water level sensor 40 into a hole defined in a side of the purified water storage tank 31.

A stopper 405 protrudes from an outer surface of the coupling part 402. The stopper 405 prevents the coupling part 402 from being excessively inserted into the hole of the purified water storage tank 31.

The stopper 405 may further include a water leakage prevention packing 406 contacting the stopper 405 on an opposite side of the sensor part 401. The water leakage prevention packing 406 is formed of a material such as silicon having strong water-resistance. Also, the water leakage prevention packing 406 may have elasticity to minimize a leakage of water within the purified water storage tank 31 to the outside through a hole (not shown) defined in the purified water storage tank 31.

The coupling part 402 has a non-circular end 403. Also, the hole of the purified water storage tank 31 in which the coupling part 402 is inserted may have a non-circular shape. For example, the end 403 of the coupling part 402 may have a "D" shape in section.

An electric wire (not shown) connected to the plurality of sensors within the sensor part 401 may be taken out to the outside of the purified water storage tank 31 through the inside of the coupling part 402.

Since the end 403 of the coupling part 402 and the hole of the purified water storage tank 31 have the non-circular shapes corresponding to each other, when the coupling part 402 is inserted and assembled into the purified water storage tank 31 to correspond to each other, the sensor part 401 may be mounted so that the sensor part 401 measures a water level within the purified water storage tank 31. Thus, when the water level sensor 40 is mounted on the purified water storage tank 31, convenience of the assembly may be improved.

A coupling groove 404 is defined in an outer surface of the coupling part 402. A coupling device 41 that will now be described may be seated in the coupling groove 404.

The coupling device 41 includes a coupling body 411 having a ring shape, at least one protrusion rib 413 disposed on an outer surface of the coupling body 411, and at least one protrusion 412 disposed on an inner surface of the coupling body 411.

The coupling device 41 is coupled to the coupling part 402 from the outside of the purified water storage tank 31 to fix the water level sensor 40 to the purified water storage tank 31.

The protrusion rib 413 may serve as a handle so that the coupling device 40 is easily rotated and coupled to the coupling part 402. The protrusion 412 may be seated in the coupling groove 404.

Figure 10:
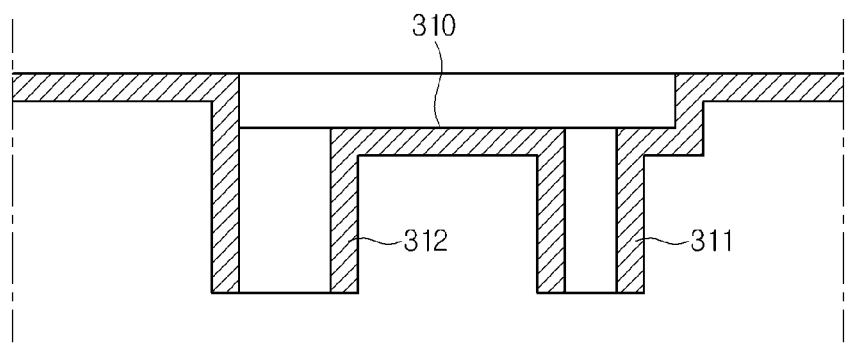
FIG. 10 is a sectional view taken along line A-A of FIG. 5 according to a first embodiment.

FIG. 10 is a sectional view taken along line A-A of FIG. 5 according to a first embodiment.

Referring to FIG. 10, a tube connection part 310 (that may be called a recess part) is defined in a bottom surface of the purified water storage tank 31. The bottom surface of the purified water storage tank 31 may be recessed downward to form the tube connection part 310. The purified water introduction part 311 and the hot water storage tank discharge part 312 are disposed in the tube connection part 310.

The purified water introduced through the purified water introduction part 311 may flow within the tube connection part 310 to flow into the hot water storage tank discharge part 312. As described above, since the tube connection part has the recessed shape, the purified water introduced through the purified water introduction part 311 may flow firstly into the hot water storage tank 33.

The hot water storage tank discharge part 312 may have a diameter less than that of the purified water introduction part 311 so that the flowing water is sufficient. As described above, since the hot water storage tank discharge part 312 has a relatively large diameter, when a user uses a large amount of hot water, purified water may be quickly introduced into the hot water storage tank 33.

Figure 11:
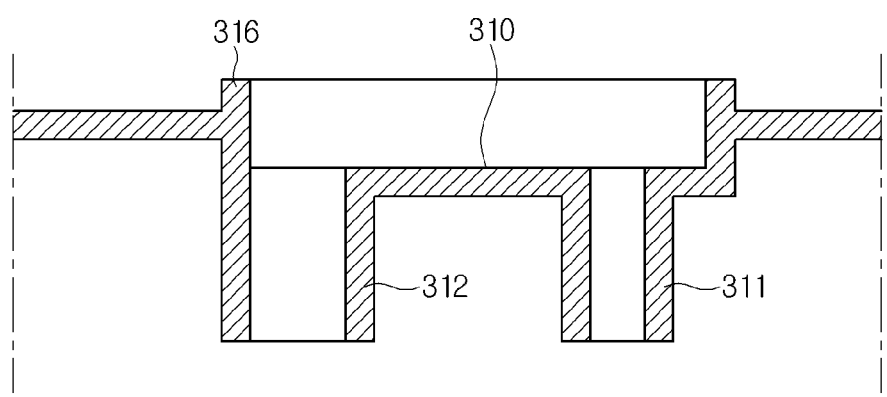
FIG. 11 is a sectional view taken along line A-A of FIG. 5 according to a second embodiment.

FIG. 11 is a sectional view taken along line A-A of FIG. 5 according to a second embodiment.

The current embodiment is the same as the first embodiment except that a rib is disposed on a bottom surface of a purified water storage tank. Thus, only characterized parts in the current embodiment will be described below.

Referring to FIG. 11, a guide rib 316 protrudes from a bottom surface of a purified water storage tank 31 according to the current embodiment. The guide rib 316 is disposed at a position corresponding to that of a tube connection part 310. The guide rib 316 may guide the purified water introduced into the purified water introduction part 311 firstly to the hot water storage tank discharge part 312. When the guide rib is disposed on the purified water storage tank 31, the recessed tube connection part 310 may be omitted. In this case, the guide rib 316 forms a close loop. Thus, the purified water introduction part 311 and the hot water storage tank discharge part 312 may be disposed within a region defined by the guide rib 316.

Figure 12:
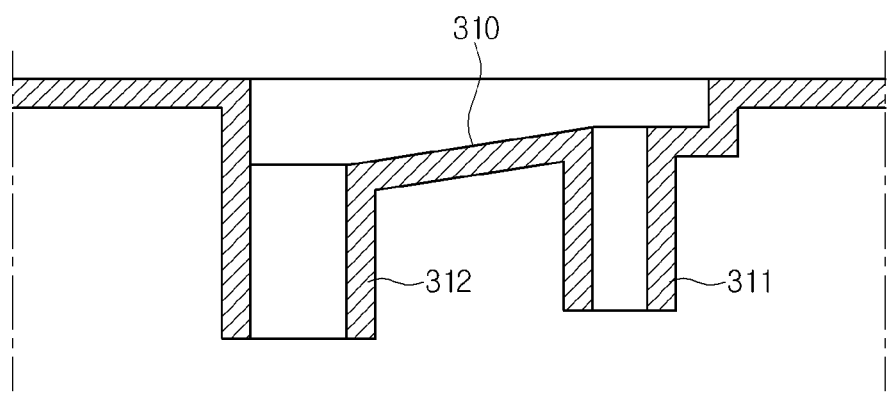
FIG. 12 is a sectional view taken along line A-A of FIG. 5 according to a third embodiment.

FIG. 12 is a sectional view taken along line A-A of FIG. 5 according to a third embodiment.

The current embodiment is the same as the first embodiment except for a shape of a tube connection part. Thus, only characterized parts in the current embodiment will be described below.

Referring to FIG. 12, a tube connection part 320 may be inclined downward from a purified water introduction part 311 towards a hot water storage tank discharge part 312. According to another embodiment, the tube connection part 320 may have a stopped portion so that the purified water introduction part 311 is disposed at a position higher than that of the hot water storage tank discharge part 312.

Figure 13:
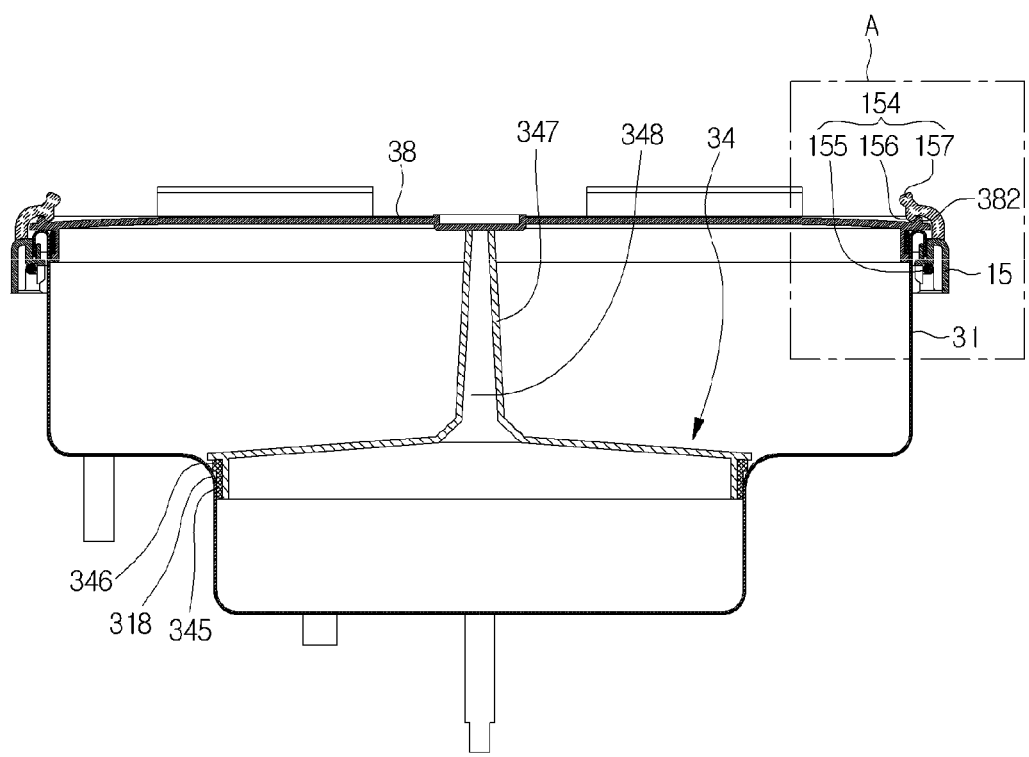
FIG. 13 is a sectional view taken along line B-B of FIG. 4.
Figure 14:
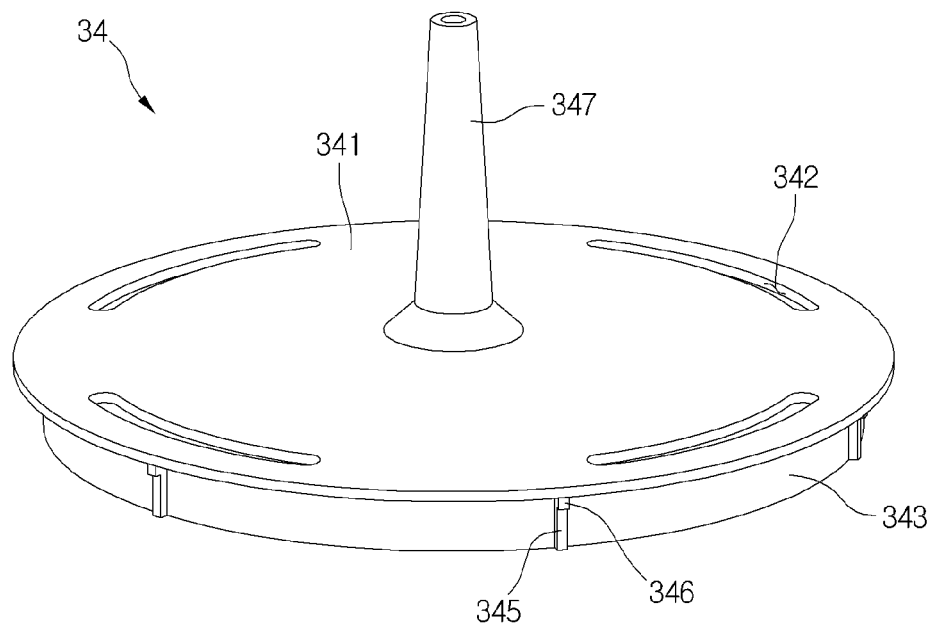
FIG. 14 is a perspective view of a barrier for partitioning the cool water storage tank and the purified water storage tank from each other.

FIG. 13 is a sectional view taken along line B-B of FIG. 4. FIG. 14 is a perspective view of a barrier for partitioning the cool water storage tank and the purified water storage tank from each other.

Referring to FIGS. 13 and 14, the purified water storage tank 31 and the cool water storage tank 32 may be partitioned by a barrier 34 (a separation unit). A seat part 318 may be disposed on a portion at which the purified water storage tank 31 and the cool water storage tank 32 are connected to each other. The barrier 34 may be seated on the seat part 318. The seat part 318 may be rounded or inclined. The barrier 34 may be formed of a metal material or a plastic material. The barrier 34 may be formed of a metal material, e.g., a stainless material.

The barrier 34 includes a partition part 341, a support part 343 extending downward from the partition part 341 and seated on the seat part 318, and an extension part 347 extending upward from the partition part 341.

The partition part 341 may have a shape corresponding to that of the cool water storage tank 32. For example, the partition part 341 may have a circular shape. At least one hole 342 may be defined in the partition part 341. The purified water stored in the purified water storage tank 31 may flow into the cool water storage tank 32 through the at least one hole 341.

The partition part 341 may be gradually inclined downward from a center to the outside and be rounded downward. Thus, air bubbles generated in the cool water storage tank 32 may be concentrated at a center of the partition part 341.

The support part 343 may be inserted into the cool water storage part 32. A plurality of contact protrusions 345 are disposed on the support part 343. The plurality of contact protrusions 345 are spaced from each other along a circumference direction of the support part 343.

Also, an outer surface of the support part 343 is spaced from an inner surface of the cool water storage tank 32 by the contact protrusions 345. A support protrusion 346 is disposed on an upper portion of each of the contact protrusions 345. The support protrusion 346 is seated on the seat part 318.

When the barrier 34 is seated on the seat part 318, a passage through which water flows may be defined between the plurality of contact protrusions 345. Water within the purified water storage tank 31 may be moved into the cool water storage tank 32 along the passage. The water moved into the cool water storage tank 32 along the passage may be heat-exchanged with a wall of the cool water storage tank 32 to improve cooling efficiency.

An air passage 348 through which air flows is defined in the extension part 347. A cover 38 covering an upper side of the purified water storage tank 31 may be seated on the extension part 347. Here, the cover 38 may press against the extension part 347. Alternatively, the extension part 347 may support the cover 38. Thus, it may prevent the barrier 34 from being shaken within the purified water storage tank 31. The cover 38 may include a press part for pressing against the extension part 347. A top surface of the cover 38 may be recessed downward to form the press part. That is, the press part protrudes downward from the cover 38.

The cover 38 covers the air passage 348 in a state where the cover 38 covers the cool water storage tank 31. Also, when the cover 34 is opened, air generated in the cool water storage tank 32 may be discharged to the outside of the cool water storage tank 32 through the air passage 348.

Figure 15:
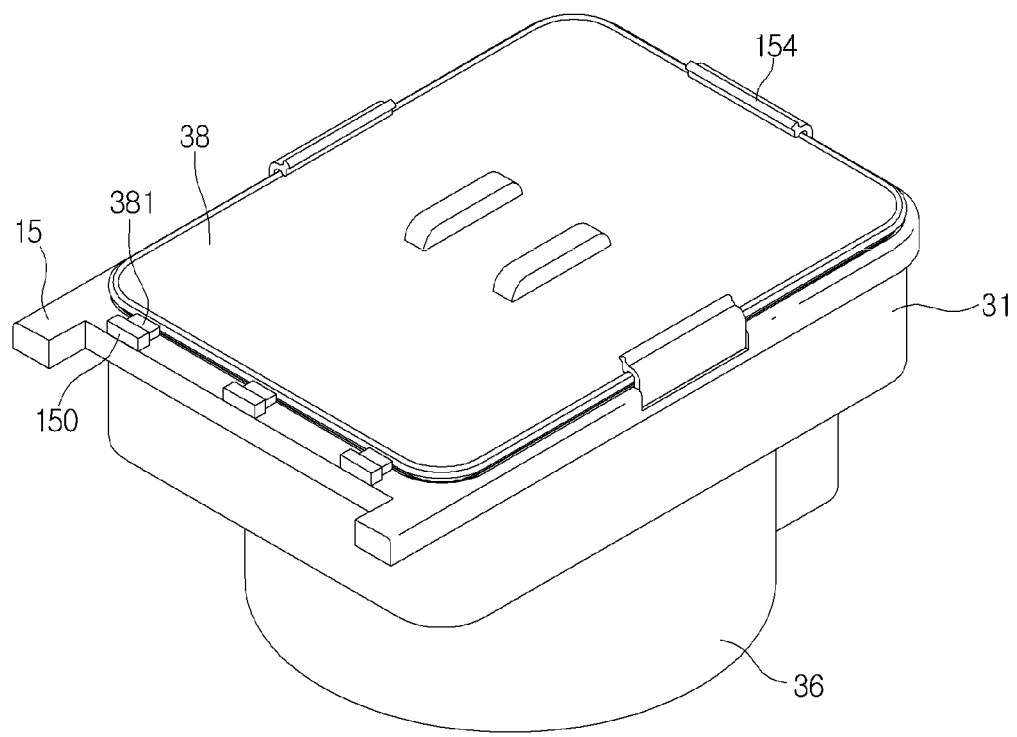
FIG. 15 is a perspective view of a state in which an insulator covers the cool water storage tank.
Figure 16:
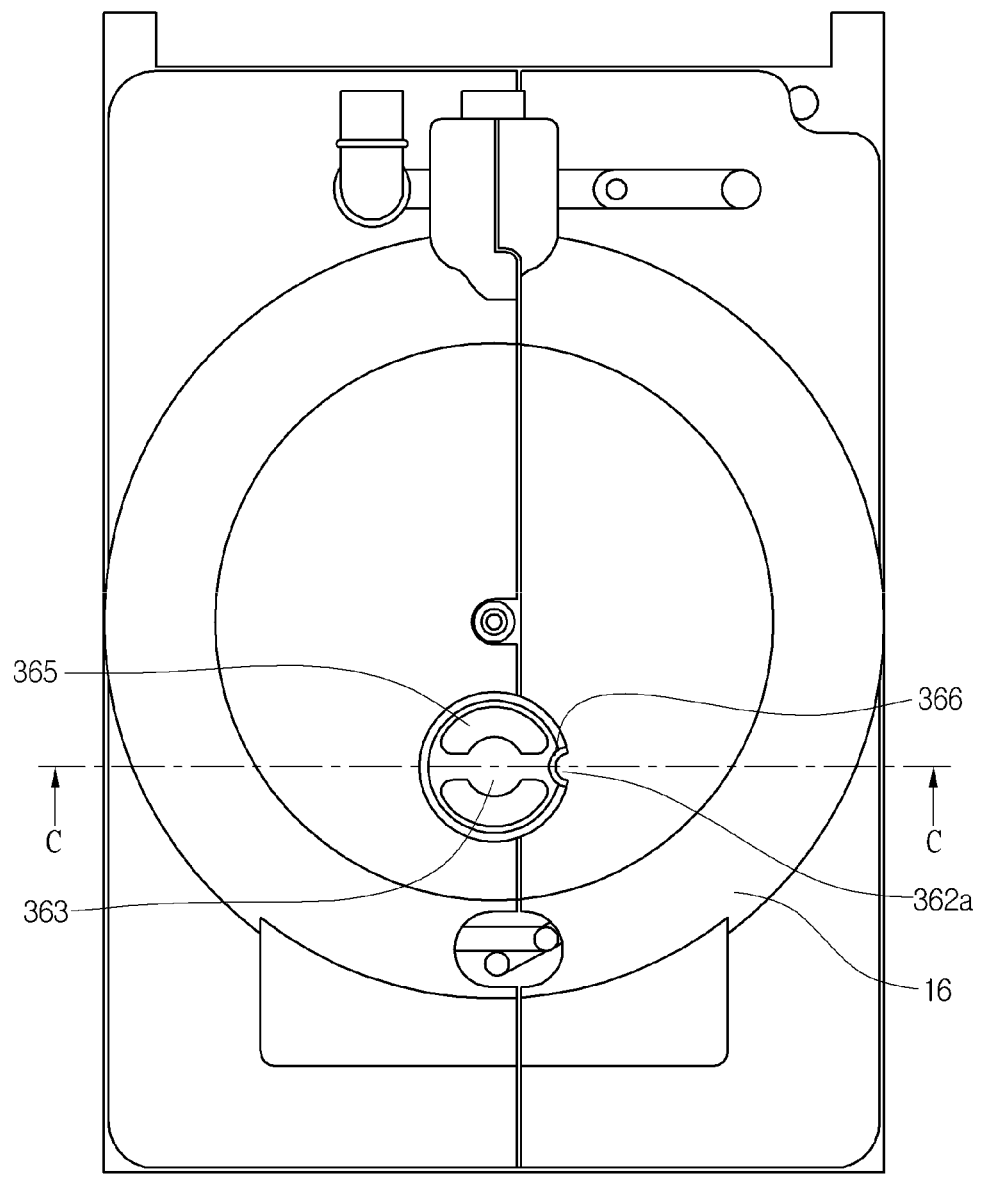
FIG. 16 is a view of a state in which the cool water storage tank is seated on a middle plate in a state where the insulator covers the cool water storage tank.
Figure 17:
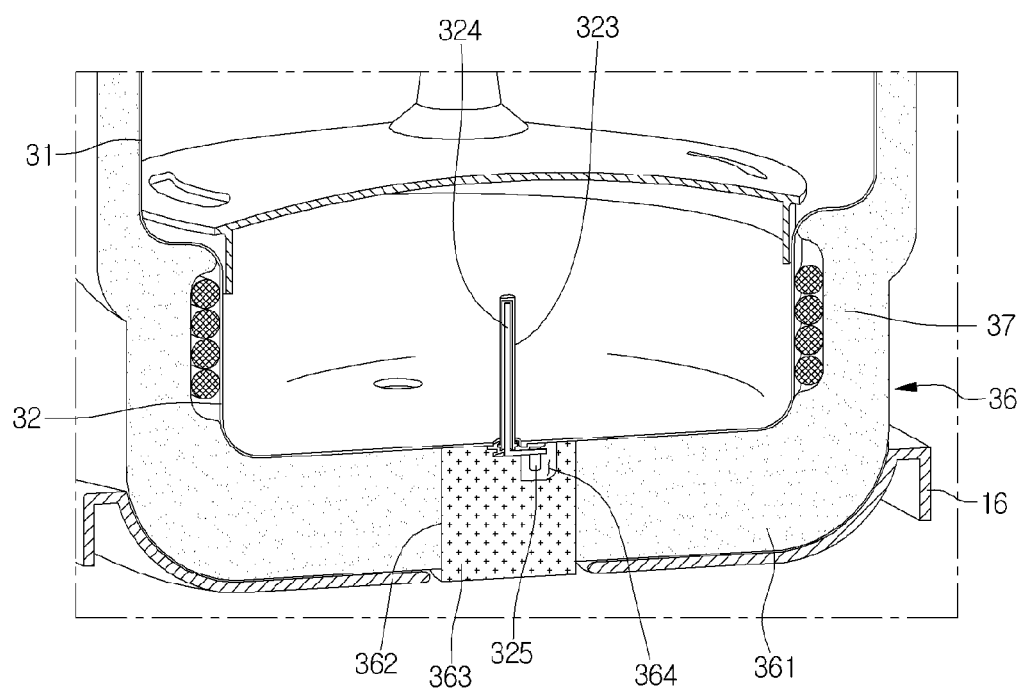
FIG. 17 is a sectional view taken along line C-C of FIG. 16.

FIG. 15 is a perspective view of a state in which an insulator covers the cool water storage tank. FIG. 16 is a view of a state in which the cool water storage tank is seated on a middle plate in a state where the insulator covers the cool water storage tank. FIG. 17 is a sectional view taken along line C-C of FIG. 16.

Referring to FIGS. 15 to 17, a heat exchange tube 37 constituting the cooler may be wound around an outer surface of the cool water storage tank 32. In the current embodiment, the cooler includes a compressor, a condenser, an expansion unit, and an evaporator. The heat exchange tube 37 may be a refrigerant tube constituting the evaporator.

The cool water storage tank 32 is covered by an insulator 36 in a state where the heat exchange tube 37 is wound around the cool water storage tank 37 to thermally insulate the cool water storage tank 32. A cool water temperature sensor 324 for detecting a temperature of cool water is disposed on a bottom surface of the cool water storage tank 32. The cool water temperature sensor 324 is inserted into a sensor insertion tube 323 passing through the bottom of the cool water storage tank 32. The cool water temperature sensor 324 inserted into the sensor insertion tube 323 is fixed to the bottom of the cool water storage tank 32 by a fixing member 325. For another example, the sensor insertion tube 323 may be integrated with the bottom of the cool water storage tank 32.

The fixing member 324 may be disposed on an outer surface of the fixing member 324. The fixing member 324 may be integrated with the cool water storage tank 32. Alternatively, the fixing member 324 may be provided as a part separated from the cool water storage tank 32 and then coupled to the cool water storage tank 32.

The insulator 36 includes a cover part 361 covering the cool water storage tank 32 and a service member 363 separably coupled to the cover part 361. The cover part 361 is seated on a middle plate 16 constituting the main body 10 in a state where the cover part 361 surrounds the cool water storage tank 32. A service hole 362 is defined in a position corresponding to that of the cool water temperature sensor 324, and the service member 363 is coupled to the service hole 362. Here, an opening is defined in a position corresponding to that of the service hole 362 of the middle plate 16 so that the service member 363 can be separated from the cover part 361 in a state where the cover part 361 is seated on the middle plate 16.

Also, an interference prevention space 364 for preventing the fixing member 325 and the cool water temperature sensor 324 from interfering with each other is defined in the service member 363.

The service member 363 may include a handle 365 used for pulling the service member 363 from the service hole 362 and a guide groove 366 for guiding an insertion direction of the service member 363. Here, a guide part 362a inserted into the guide groove 366 may be disposed in the service hole 362.

According to the current embodiment, even though the insulator 36 is seated on the middle plate 16, the service member 363 may be separated to replace the cool water temperature sensor 324.

Figure 18:
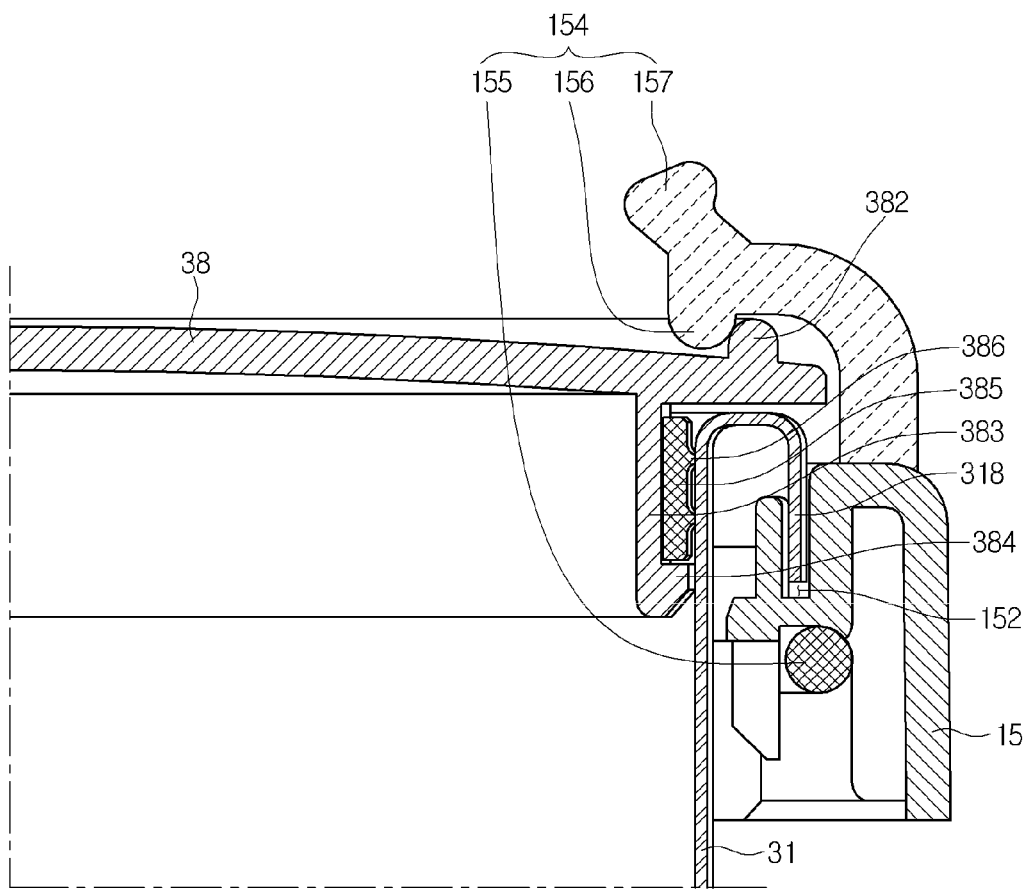
FIG. 18 is an enlarged view illustrating a portion A of FIG. 13.

FIG. 18 is an enlarged view illustrating a portion A of FIG. 13.

Referring to FIGS. 4 and 18, the purified water storage tank 31 may be shielded by the cover 38 in a state where the purified water is seated on the upper frame 15.

A coupling protrusion 381 inserted into a protrusion receiving part 150 defined in the upper frame 15 is disposed on the cover 38.

The purified water storage tank 31 includes the seat part 318 seated on the upper frame 15. The seat part 318 may be horizontally bent after an upper end of the purified water storage tank 31 is horizontally bent. A seat groove 152 in which the seat part 318 is seated is defined in the upper frame 15. Also, a clip 154 coupled to the cover 38 covering the purified water storage tank 31 is disposed on the upper frame 15.

The cover 38 includes a coupling protrusion 382 coupled to the clip 154 and an extension part 383 inserted into the purified water storage tank 31. The coupling protrusion 382 is disposed on a top surface of the cover 38, and the extension part 383 extends downward from a bottom surface of the cover 38. A packing 385 for improving sealing of the purified water storage tank 31 is disposed around an outer surface of the extension part 383. A support part 384 for supporting the packing 385 is disposed on a lower end of the extension part 383. At least one contact protrusion 386 contacting an inner surface of the purified water storage tank 31 is disposed on an outer surface of the packing 385. The at least one contact protrusion 386 may be continuously disposed along a circumference of the packing 385.

The clip 154 has one side rotatably hinge-coupled to the upper frame 15 by a hinge 155. The clip 154 may include a hook part 156 hooked on the coupling protrusion 382 and a handle 157 configured to easily grasp the clip 154.

Thus, the cover 38 may be firmly fixed secondly to the clip 154 in a state where the coupling protrusion 382 is inserted into the protrusion receiving part 150 to allow the cover to be fixed to the upper frame 15 firstly.

In the current embodiment, since the purified water storage tank 31 is directly pressed by the packing 385 disposed on the cover 38, the sealing may be improved.

Also, since the purified water storage tank 31 is provided as a part separated from the upper frame 15 and covered by the cover, the purified water storage tank 31 may be formed of a stainless steel for sanitation.

Figure 19:
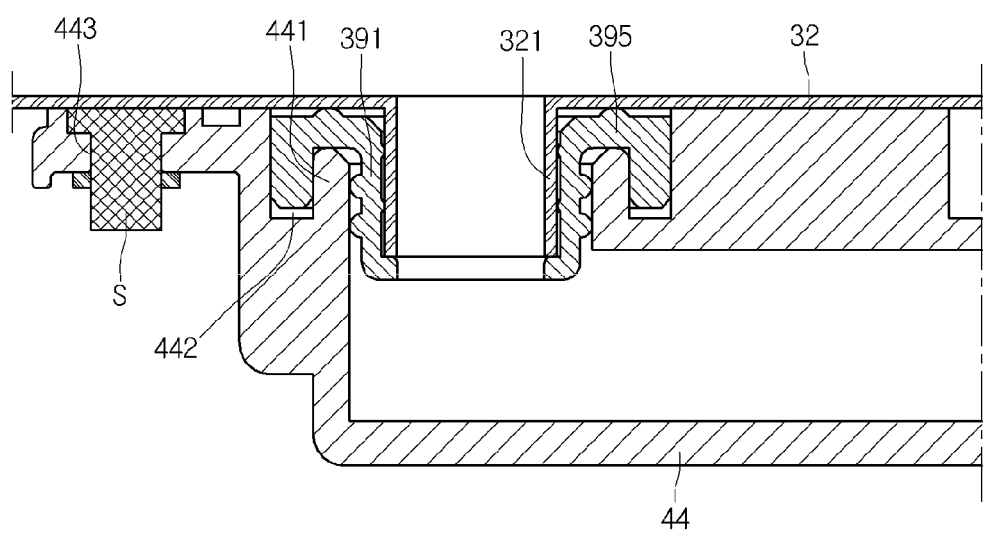
FIG. 19 is a sectional view taken along line D-D of FIG. 5.
Figure 20:
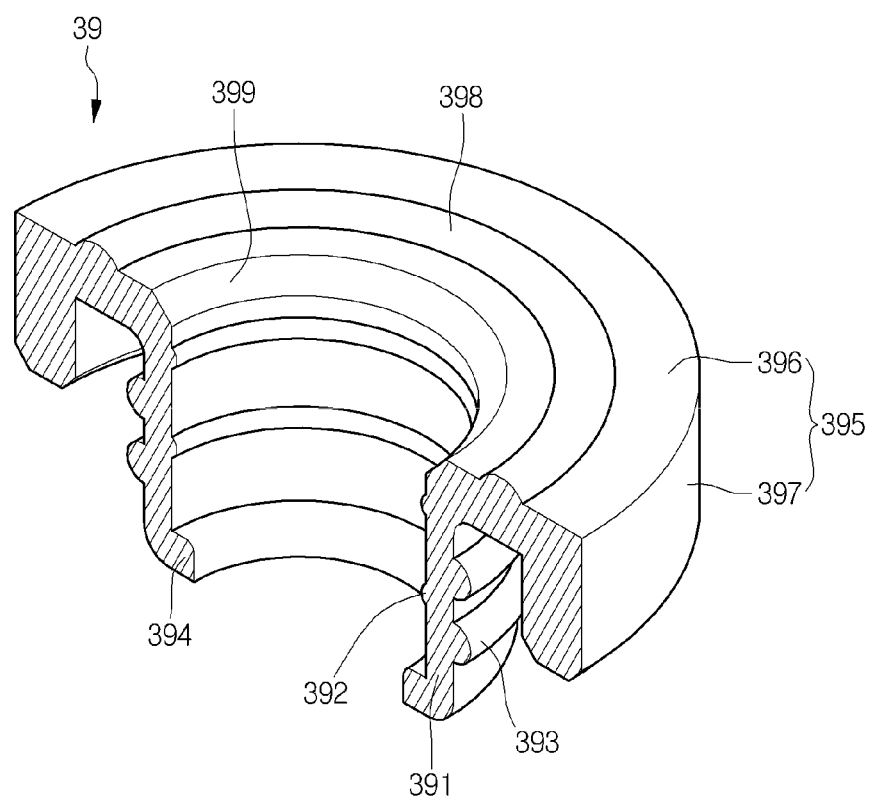
FIG. 20 is a sectional perspective view illustrating a packing member of FIG. 19.

FIG. 19 is a sectional view taken along line D-D of FIG. 5. FIG. 20 is a sectional perspective view illustrating a packing member of FIG. 19.

Referring to FIGS. 19 and 20, the cool water discharge tube 44 for discharging cool water to the cool water storage tank 32 is connected to a lower portion of the cool water storage tank 32. Also, a packing member 39 for preventing water within the cool water storage tank 32 from leaking is disposed on the cool water discharge tube 44.

A cool water discharge part 321 for discharging stored water and a coupling part S for fixing the cool water discharge tube 44 are disposed on the bottom of the cool water storage tank 32.

The cool water discharge part 321 may be integrated with the cool water storage tank 32. Alternatively, the cool water discharge part 321 may be provided as a part separated from the cool water storage tank 32 and then coupled to the cool water storage tank 32. The coupling part S may be integrated with the cool water storage tank 32. Alternatively, the coupling part S may be provided as a part separated from the cool water storage tank 32 and then coupled to the cool water storage tank 32.

The packing member 39 includes a packing body 391 coupled to the cool water discharge part 321 and a hook part 395 bent from the packing body 391 and coupled to the cool water discharge tube 44.

At least one first sealing part 392 may be disposed on an inner surface of the packing body 391. When the packing member 39 is coupled to the cool water discharge part 321, the first sealing part 392 is closely attached to an outer surface of the cool water discharge part 321 to prevent water from leaking between the outer surface of the cool water discharge part 321 and the inner surface of the packing body 391.

The packing body 391 is inserted into the cool water discharge tube 44, and the dispenser 321 is inserted into the packing body 391. At least one second sealing part 393 may be disposed on an outer surface of the packing body 391. The packing body 391 is closely attached to an inner surface of the cool water discharge tube 44 by the second sealing part 393 to prevent water from leaking between the outer surface of the packing body 391 and the inner surface of the cool water discharge tube 44.

A hook 394 on which the cool water discharge part 321 is seated may be disposed on the packing body 391. Thus, it may prevent water from leaking through an end of the cool water discharge part 321.

The hook part 395 includes a first extension part 396 horizontally extending from the packing body 391 and a second extension part 397 bent from an end of the first extension part 396. The second extension part 397 may extend downward from the first extension part 396.

An inclined part 399 may be disposed between the packing body 391 and the first extension part 396. The hook part 395 may be elastically deformed by the packing body 391 due to the inclined part 399. Thus, when the cool water discharge part 321 is coupled to the packing member 39, the first extension part 396 may be closely attached to the outer surface of the cool water storage tank 32.

An insertion groove 442 in which the second extension part 397 is inserted is defined in the cool water discharge tube 44. A third sealing part 398 may be disposed on the first extension part 396. The third sealing part 398 presses an under surface of the cool water storage tank 32 to prevent water from leaking between the under surface of the cool water storage tank 32 and the first extension part 396. The first extension part 396 is seated on a wall 441 defining the insertion groove 442.

A coupling hole 443 through which the coupling part S passes may be defined in the cool water discharge tube 44. When the cool water discharge tube 44 is coupled, the coupling part 320 may pass through the coupling hole 443. For example, when a nut is coupled to the coupling part S, the cool water discharge tube 44 may be fixed to the cool water storage tank 32.

In the current embodiment, it may prevent water from leaking between the cool water discharge part 321 and an inner surface of the packing body 391 by the hook 394, the first sealing part 392, and third sealing part 398.

Also, it may prevent water from leaking between an outer surface of the packing body 391 and the cool water discharge tube 44 by the second sealing part 393 and the second extension part 397.

Although the packing member is disposed on the cool water discharge tube 44 in the current embodiment, the present disclosure is not limited thereto. For example, the packing member may be applied also to the hot water discharge tube and the purified water discharge tube.

Figure 21:
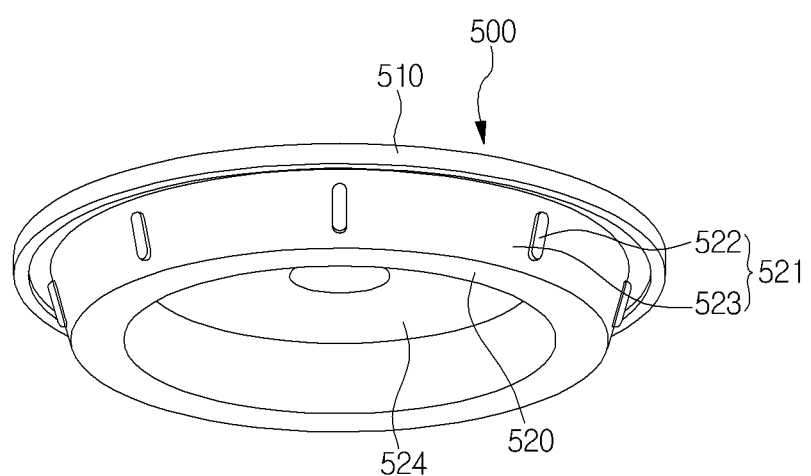
FIG. 21 is a perspective view of a separation unit according to another embodiment.
Figure 22:
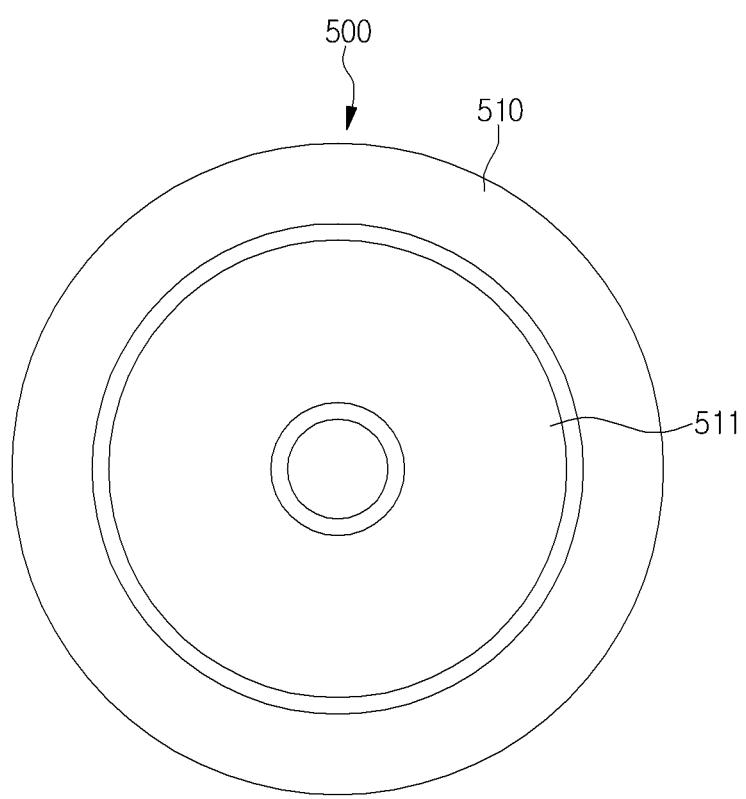
FIG. 22 is a plan view of the separation unit according to another embodiment.
Figure 23:
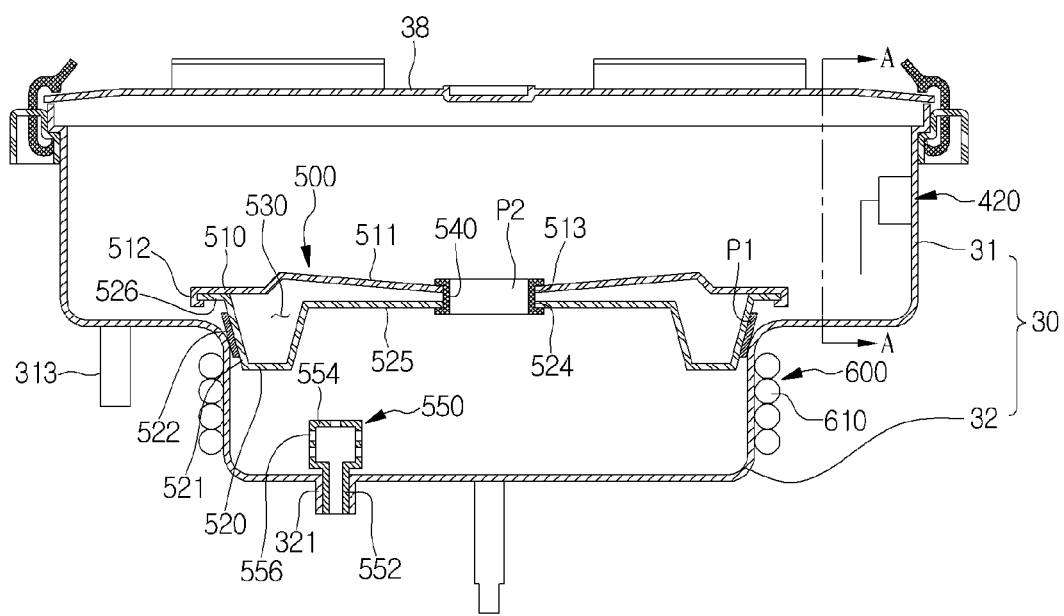
FIG. 23 is a sectional view of a state in which a cover covers a storage part according to another embodiment.

FIG. 21 is a perspective view of a separation unit according to another embodiment. FIG. 22 is a plan view of the separation unit according to another embodiment. FIG. 23 is a sectional view of a state in which a cover covers a storage part according to another embodiment.

The current embodiment is the same as the foregoing embodiments except for a separation unit. Thus, only characterized parts in the current embodiment will be described below.

Referring to FIGS. 21 to 23, a separation unit 500 according to the current embodiment may divide an inner space of a storage part 30 (or a water storage tank) into a plurality of spaces. That is, the separation unit 500 may partition a purified water storage tank 31 and a cool water storage tank 32 from each other. A cover 38 may be seated on an opened upper side of the storage part 30. Thus, the cover 38 may cover the storage part 30.

The separation unit 500 does not ascend by buoyancy due to a self-weight without providing a separate fixing unit. The separation unit 500 may be formed of a stainless material or a metal material. Also, the storage part 30 may be formed of a stainless material or a metal material to improve sanitation and easy of cleaning.

The separation unit 500 includes a first member 510 contacting water within the purified water storage tank 31 (or a first water storage tank) and a second member 520 coupled to the first member 510 and contacting water within the cool water storage tank 32 (or a second water storage tank).

A first hole 513 through which water passes is defined in a central portion of the first member 510. A top surface 511 of the first member 510 may be gradually inclined downward from outside toward the first hole 513. That is, when viewed on the whole separation unit 500, a top surface of the separation unit 500 may be gradually inclined downward from the outside toward the first hole 513. Thus, water stored in the purified water storage tank 31 may easily flow into the cool water storage tank 32 through the first hole 513.

At least one contact part 522 contacting an inner surface of the storage part 30 is disposed on a side surface 421 of the second member 520. The contact part 522 protrudes from the side surface 521 of the second member 520. In the current embodiment, since a portion of the side surface 521 of the second member 520 contacts the inner surface of the storage part 30 by the contact part 522, the side surface 521 may be called a contact surface.

For example, FIG. 21 illustrates a structure in which a plurality of contact parts 522 are disposed on the side surface 521 of the second member 520. When the plurality of contact parts 522 are disposed on the second member 520, the plurality of contact parts 522 may be spaced from each other along a circumference of the side surface 521 of the second member 520.

The contact parts 522 may contact a boundary between the purified water storage tank 31 and the cool water storage tank 32. The boundary between the purified water storage tank and the cool water storage tank 32 may be rounded. A portion of the side surface 521 of the second member 520 except for the portions on which the contact parts 522 are disposed may constitute a non-contact part 523 which does not contact the storage part 30.

For another example, the contact part 522 may be recessed from the side surface 521 of the second member 520. Also, a protrusion inserted into the contact part 522 may be disposed on an inner surface of the storage part 30. As described above, even though the protrusion is inserted into the contact part 522, when the protrusion has a protruding length greater than a recessed depth of the contact part 522, a non-contact part may be provided on the second member 520.

In the current embodiment, a first passage P1 through which water within the purified water storage tank 31 flows into the cool water storage tank 32 may be defined between the non-contact part 523 and the inner surface of the storage part 30 by the non-contact part 523 of the second member 520. Here, the side surface of the second member 520 may be inclined so that the water within the purified water storage tank 31 smoothly flows into the cool water storage tank 32. That is, the side surface of the second member 520 may be inclined downward toward a center.

A second hole 524 through which water within the purified water storage tank 31 passes is defined in a central portion of the second member 520. Thus, the water within the purified water storage tank 31 may flow into the cool water storage tank 32 through the first hole 513 and the second hole 524. Thus, the first and second holes 513 and 524 may define a second passage P2 through which the water within the purified water storage tank 31 flows into the cool water storage tank 32.

A recess part 525 recessed upward to increase storage capacity of the cool water storage tank 32 may be defined in the second member 520.

An extension part 526 extending in a horizontal direction may be disposed on an end of the second member 520. A coupling part 512 surrounding the extension part 526 and coupled to the second member 520 may be disposed on an end of the first member 510. Also, a coupling member 540 for coupling the first member 510 to the second member 520 may be further disposed on the first hole 513 of the first member 510 and the second hole 524 of the second member 520. The coupling member 540 may include a rivet and couple the first and second members 510 and 520 to each other. For another example, a coupling member may not be provided as a separate part and may be disposed on the first member 510 or the second member 520 to couple the first and second members 510 and 520 to each other. For another example, the first and second members 510 and 520 may be coupled to each other by an adhesive or welding. The present disclosure is not limited to the coupling method between the first member and the second member.

On the whole constitution of the separation unit 500 in which the first member 510 and the second member 520 are completely coupled to each other, the first member 510 may be called a partition part partitioning the storage part 30 into a plurality of spaces. Also, a portion of the second member 520 except for the recess part 525 may be called an extension part. For another example, the separation unit 500 may not be provided by coupling a plurality of members, but may be provided as a single member including a partition part and an extension part extending from the partition part. Alternatively, the separation unit 500 may include an extension part having a ring shape to provide a partition part extending in a horizontal direction and a recess part coupled to the partition part to increase the storage capacity of the cool water storage tank 32.

In the state where the first member 510 and the second member 520 are coupled to each other, at least portions of the first member 510 and the second member 520 may be spaced from each other. Thus, an insulation layer 530 for thermally insulating water having temperatures different from each other may be provided within the separation unit 500. In the current embodiment, the insulation layer 530 may be an air layer. Alternatively, the insulation layer 530 may be provided as a separate insulator.

Since the cool water storage tank 32 and the purified water storage tank 31 may be thermally insulated by the insulation layer provided within the separation unit 500, it won't be an issue for insulation performance even though an insulation part of the purified water storage tank 31 has a thickness less than that of an insulation part of the cool water storage tank 32.

According to the current embodiment, even though the separation unit 500 is formed of a stainless material or a metal material, heat exchange between water having temperatures different from each other may be minimized by the insulation layer 530 within the separation unit 500.

A cooler 600 for cooling water stored in the cool water storage tank 32 may be disposed outside the storage part 30, i.e., the cool water storage tank 32. In the current embodiment, when the storage part 30 is formed of a metal material or a stainless material, since thermal conductivity of the storage part 30 itself is increased, the cooler 600 may be provided outside the storage part 30. In this case, since the cooler 600 is not provided inside the storage part 30, a reduction of the capacity of the storage part 30 may be prevented, and cleaning of the storage part 30 may be easy.

For example, the cooler 600 may include a refrigerant tube 610 constituting a refrigerant cycle. The refrigerant tube 610 may be wound around an outer surface of the storage part 30, i.e., an outer surface of the cool water storage tank 32.

A first discharge part 313 in which purified water is discharged is provided in a bottom of the purified water storage tank 31, and a second discharge part 321 in which cool water is discharged is provided in a bottom of the cool water storage tank 32. Also, a filter part 550 for filtering water discharged from each of the discharging parts 313 and 321 may be provided. For example, FIG. 23 illustrates a structure in which the filter part 550 is disposed on the second discharge part 321.

The filter part 550 includes an insertion part 552 inserted into the discharge parts 313 and 321 and a filter body 554 disposed above the insertion part 552 and having at least one hole 556 through which water flows. Thus, when water within the purified water storage tank and the cool water storage tank, foreign substances may be filtered by the hole 556. Then, the water filtering the foreign substances flows into the filter body 554 and the insertion part 552.

A water level sensor 420 for detecting a water level may be further disposed in the storage part 30.

Figure 24:
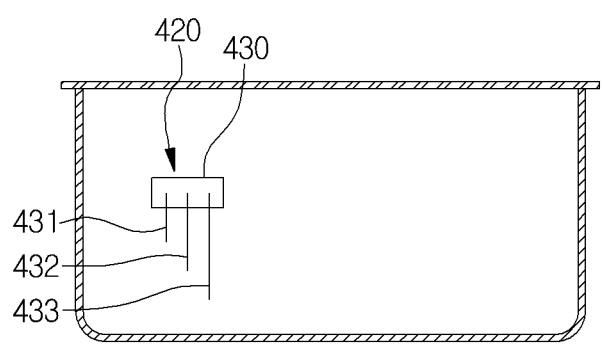
FIG. 24 is a sectional view taken along line A-A of FIG. 23.

FIG. 24 is a sectional view taken along line A-A of FIG. 23.

Referring to FIG. 24, the water level sensor 420 according to the current embodiment includes a plurality of contact parts 431, 432, and 433 contacting water ((e.g., purified water) within the storage part 150 and a support part 430 supporting the plurality of contact parts 431, 432, and 433. The water level sensor 420 detects a water level by a variation in capacitance due to direct contact with water.

In detail, the support part 430 may be formed of a stainless material or a metal material. Also, the support part 430 may be coupled to the storage part 30 inside the storage part 30. A fixing part (not shown) for fixing a position of the support part 430 may be disposed outside the storage part 30 and coupled to the support part 430.

The plurality of contact parts 431, 432, and 433 may have lengths different from each other. Here, each length denotes a vertical length within the storage part 30. Thus, the water level within the storage part 30 may be multiply detected due to a difference of the lengths of the plurality of contact parts 431, 432, and 433.

Figure 25:
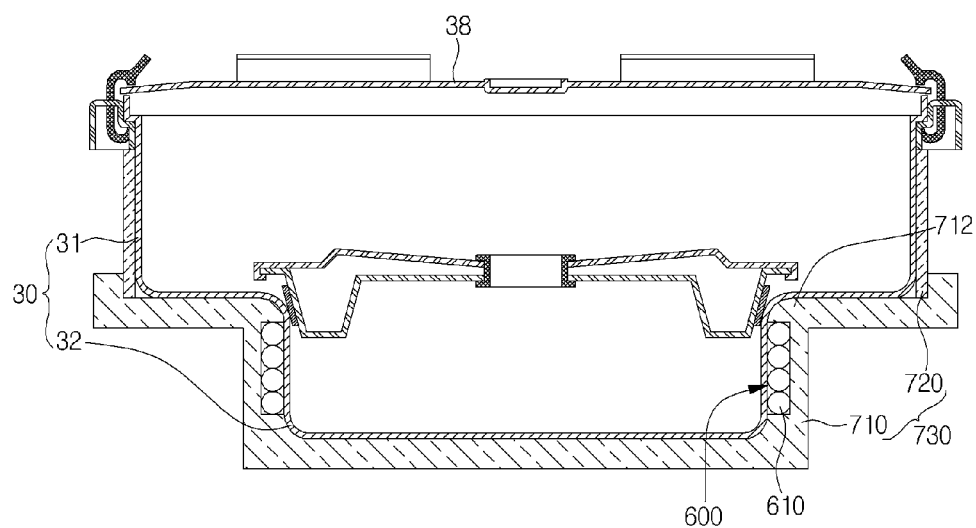
FIG. 25 is a view of a state in which an external insulation part surrounds the storage part of FIG. 23.

FIG. 25 is a view of a state in which an external insulation part surrounds the storage part of FIG. 23.

Referring to FIG. 25, an external insulation part 730 for insulating the storage part 30 from the outside is disposed outside the storage part 30 according to the current embodiment. The external insulation part 720 may include a cool water storage tank insulation part 710 surrounding the outside of the cool water storage tank 32 and a purified water storage tank insulation part 720 surrounding the outside of the purified water storage tank 31.

The purified water storage tank insulation part 720 surrounding an upper side of the storage part 30 has a thickness less than that of the cool water storage tank insulation part 710 surrounding a lower side of the storage part 30. Alternatively, the external insulation part (e.g., the purified water storage tank insulation part 720) disposed above the insulation unit 500 on the basis of the insulation unit 500 has a thickness less than that of the external insulation part (e.g., the cool water storage tank insulation part 710) disposed under the insulation unit 500 on the basis of the insulation unit 500.

The cool water storage tank insulation part 710 is formed of a foam styrofoam having superior insulation performance to surround the cool water storage tank 32 and the cooler 600. On the other hand, the purified water storage tank insulation part 720 surrounding the purified water storage tank 31 is formed of a material having superior air permeability.

This is done for a reason so that purified water received in the purified water storage tank 31 is supplied into the hot water storage tank 33 in a state where the purified water is maintained at a high temperature, i.e., transmission of cool air within the cool water storage tank 32 into the purified water storage tank 31 is reduced, and the purified water storage tank contacts external air.

For this, the purified water storage tank insulation part 720 may have the number of air through holes larger than the number of air through holes defined in the cool water storage tank insulation part 710 or have an air through hole having a size greater than that of an air through hole defined in the cool water storage tank insulation part 710. Thus, the cool water storage tank insulation part 710 is formed of the above-described foam styrofoam to surround the cool water storage tank 32, and the purified water storage tank insulation part 720 is formed of a polyurethane foam having superior air permeability to surround a side surface of the purified water storage tank 31.

Thus, the outer surface of the cool water storage tank 32 may be blocked from external air by the cool water storage tank insulation part 710 to effectively maintain a temperature of cool water. On the other hand, the outer surface of the purified water storage tank 31 may blocked from external air by the purified water storage tank insulation part 720 having the air permeability to store purified water having a relatively high temperature.

Also, the purified water storage tank insulation part 720 prevents dew from occurring on the outer surface of the purified water storage tank 31 thereby preventing dewdrops from dropping onto the compressor or other electrical components.

Also, the cool water storage tank insulation part 710 surrounds all of the cool water storage tank 32 and the cooler 600 to prevent cool air within the cooler 600 from being directly transferred. That is, the cool water storage tank 32 is disposed under the purified water storage tank 31. Also, the cool water storage tank 32 and the purified water storage tank 31 have a height difference. The cooler 600 contacts the cool water storage tank 32 at a position spaced from the bottom of the purified water storage tank 31. A portion 712 of the external insulation part (i.e., the cool water storage tank insulation part 710) is disposed between the bottom of the purified water storage tank 31 and the cooler 600.

Thus, it may prevent the cool air generated in the cooler 600 from being directly transferred into the purified water storage tank 31 thereby reducing heat exchange between the purified water and the cool water.

Due to the above-described structure, since the hot water storage tank 33 for receiving purified water from the purified water storage tank 31 to generate hot water receives purified water having a relatively high temperature, energy consumed for generating hot water may be reduced.

Figure 26:
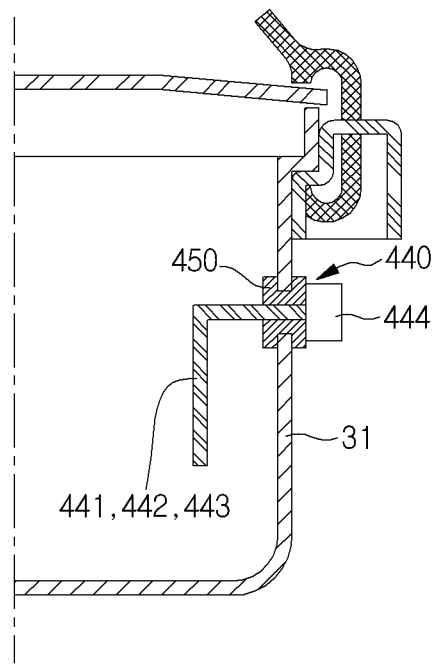
FIG. 26 is a sectional view taken along line A-A of FIG. 23 according to another embodiment.

FIG. 26 is a sectional view taken along line A-A of FIG. 23 according to another embodiment.

The current embodiment is the same as the foregoing embodiments except for a water level sensor. Thus, a characterized part according to the current embodiment will be principally described.

Referring to FIG. 26, a water level sensor 440 according to the current embodiment includes a plurality of contact parts 441, 442, 443 contacting water (e.g., purified water) within a storage part 150 and a support part 444 supporting the plurality of contact parts 441, 442, and 443.

In detail, the plurality of contact parts 441, 442, and 443 may have lengths different from each other. For example, the support part 444 may be formed of a plastic material. Thus, for sanitation, the support part 444 may be coupled to the storage part 30 at the outside of the storage part 30. Also, the plurality of contact parts 441, 442, and 443 pass through the storage part 30 and are disposed within the storage part 30. Here, a sealer 450 for sealing is disposed on portions of the storage part 30 through which the plurality of contact parts 441, 442, and 443 pass. That is, each of the plurality of contact parts 441, 442, and 443 passes through the sealer 450.

Even though all the elements of the embodiments are coupled into one or operated in the combined state, the present disclosure is not limited to such an embodiment. That is, all the elements may be selectively combined with each other without departing the scope of the disclosure. Furthermore, when it is described that one comprises (or includes or has) some elements, it should be understood that it may comprise (or include or has) only those elements, or it may comprise (or include or have) other elements as well as those elements if there is no specific limitation. Unless otherwise specifically defined herein, all terms including technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments and the detailed description, but by the appended claims, and all differences within the scope will be construed as being comprised in the appended claims.

What is claimed is:

1. A water purifier comprising:
   a filter part to filter water;
   a storage part to store the water filtered by the filter part, the storage part comprising a first tank, a second tank and a connection portion that connects the first tank and the second tank, wherein the connection portion, the first tank, and the second tank are integrally formed with each other, wherein the first tank includes a first side wall and a first bottom wall extended from the first side wall, the second tank includes a second side wall and a second bottom wall extended from the second side wall, the second side wall is connected to the first bottom wall by the connection portion;
   a separation unit formed as a separate component to the storage part, disposed within an inner space of the storage part and partitioning the inner space into first and second spaces, wherein the first space has a first capacity and the second space has a second capacity less than the first capacity, the first side wall and a top surface of the separation unit define the first space, the second side wall and a bottom surface of the separation unit define the second space, and the water flows from the first space into the second space;
   wherein the separation unit comprises:
      a side surface,
      a plurality of protrusions protruded from and integrally formed with the side surface,
   wherein the plurality of protrusions includes a plurality of contact parts that contact the connection portion, and the side surface includes a non-contact part which does not contact the connection portion, and
   wherein the water that flows from the first space into second space can flow directly from the first space into the second space through a first passage defined between the non-contact part of the side surface of separation unit and the connection portion.

2. The water purifier according to claim 1, wherein
   a diameter of the first tank is greater than a diameter of the second tank, and
   wherein the side surface of the separation unit is inclined to allow the water to flow to the first passage.

3. The water purifier according to claim 2, wherein a recess part that increases a storage capacity of the second tank is defined in the separation unit.

4. The water purifier according to claim 1, wherein the separation unit comprises a partition part to partition the inner space of the storage part into the first space and the second space and an extension part extending upward from the partition part.

5. The water purifier according to claim 1,
   further comprising a second passage through which the water can directly flow from the first space into the second space, the second passage formed at the separation unit,
   wherein the top surface of the separation unit is inclined or declined from the second passage towards an outer boundary of the separation unit.

6. The water purifier according to claim 5, wherein the separation unit comprises:
   a first member that contacts water within the first space; and
   a second member that contacts water within the second space, the second member being coupled to the first member,
   wherein a hole defining the second passage is defined in each of the members.

7. The water purifier according to claim 6, wherein an insulation space to thermally insulate materials stored in the first and second spaces partitioned within the storage part is defined between the first and second members.

8. The water purifier according to claim 1, wherein the separation unit is formed of a stainless material or a metal material.

9. The water purifier according to claim 1, further comprising a cooler disposed outside the storage part to cool water stored in the second space.

10. The water purifier according to claim 9, wherein the storage part is formed of a stainless material or a metal material,
    the cooler is a refrigerant tube through which refrigerant flows, and
    the refrigerant tube is wound around an outer surface of the storage part.

11. The water purifier according to claim 1, wherein the water purifier further comprises a first discharge part disposed at a lower side of the first tank so that water within the first tank is discharged therein; and
    a second discharge part disposed at a lower side of the second tank so that water within the second tank is discharged therein.

12. The water purifier according to claim 11, wherein the first discharge part is disposed on a bottom of the first tank, and the second discharge part is disposed on a bottom of the second tank.

13. The water purifier according to claim 11, wherein the first tank has a square shape in horizontal section, and the second tank has a circular shape in horizontal section to allow the refrigerant tube to be wound therearound.

14. The water purifier according to claim 11, further comprising:
a purified water discharge tube through which the water discharged through the first discharge part flows;
a purified water valve disposed in the purified water discharge tube;
a cool water discharge tube through which the water discharged through the second discharge part flows;
a cool water valve disposed in the cool water discharge tube; and
a common tube connecting the purified water discharge tube to the cool water discharge tube.

15. The water purifier according to claim 14, further comprising a dispenser for dispensing purified water or cool water to the outside and disposed on the common tube.

16. The water purifier according to claim 15, further comprising a single lever manipulated to dispense the purified water or the cool water into the dispenser.

17. The water purifier according to claim 14, further comprising:
a panel comprising a selection part to select purified water or cool water; and
a control part to control the valves according to the selection of the selection part.

18. The water purifier according to claim 17, wherein the selection part comprises:
a cool water button to select the cool water; and
a purified water button to select the purified water.

19. The water purifier according to claim 18, further comprising a display part or a light emitting part to inform whether the cool water button or the purified water button is selected,
wherein the control part controls the display part or the light emitting part so that the light emitting part or the display part is maintained in a former display state until one of the cool water button and the purified water button is selected that changes the former display state.

20. The water purifier according to claim 17, wherein, when the cool water is selected by the selection part, the control part turns the cool water valve on and maintains the purified water valve off so that cool water within the second tank is discharged into the common tube.

21. The water purifier according to claim 17, wherein, when the purified water is selected by the selection part, the control part turns the purified water valve on and maintains the cool water valve off so that purified water within the first tank is discharged into the common tube.

22. The water purifier according to claim 17, wherein, when a low water level is detected by a water level sensor disposed in the storage part during the discharging of the cool water or the purified water or after the cool water or the purified water is completely discharged, the control part opens a flow rate adjustment valve to supply water filtered by the filter part into the storage part.

23. The water purifier according to claim 17, wherein, when a temperature detected by a temperature sensor that detects a temperature of the second tank does not satisfy a reference temperature during the discharging of the cool water or the purified water or after cool water or the purified water is completely discharged, the control part turns a cooler for cooling the second tank on.

24. The water purifier according to claim 17, further comprising a hot water storage tank to store hot water and a heater to heat water within the hot water storage tank,
where, when a temperature detected by a temperature sensor that detects a temperature of the hot water storage tank does not satisfy a reference temperature during the discharging of the hot water or after the hot water is completely discharged, the control part turns the heater on.

25. The water purifier according to claim 11, further comprising:
a purified water discharge tube through which the water discharged through the first discharge part flows;
a cool water discharge tube through which the water discharged through the second discharge part flows;
a common tube connecting the purified water discharge tube to the cool water discharge tube; and
a common valve by which purified water and cool water selectively flow, the common valve being disposed in the common tube.

26. The water purifier according to claim 1, further comprising
an external insulation part surrounding the storage part to thermally insulate the storage part from the outside,
wherein the external insulation part surrounding an upper side of the storage part has a thickness different from that of the external insulation part surrounding a lower side of the storage part.

27. The water purifier according to claim 26, wherein the external insulation part disposed above the separation unit has a thickness less than that of the external insulation part disposed under the separation unit.

28. The water purifier according to claim 26, wherein the first wall defines a purified water storage tank and the second wall defines a cool water storage tank defining the second space,
the water purifier further comprises a cooler disposed outside the cool water storage tank to cool water stored in the cool water storage tank, and the external insulation part that surrounds the cooler.

29. The water purifier according to claim 28, wherein the cool water storage tank is disposed under the purified water storage tank,
the cool water storage tank and the purified water storage tank having a height difference,
the cooler contacts the cool water storage tank at a position spaced from a bottom of the purified water storage tank, and
a portion of the external insulation part is disposed between the bottom of the purified water storage tank and the cooler.

30. The water purifier according to claim 28, wherein the external insulation part comprises:
a cool water storage tank insulation part surrounding the cool water storage tank; and
a purified water storage tank insulation part surrounding the purified water storage tank, the purified water storage tank insulation part being formed of a material different from that of the cool water storage tank insulation part.

31. The water purifier according to claim 30, wherein the cool water storage tank insulation part is a polystyrene foam, and the purified water storage tank insulation part is a polyurethane foam having air permeability.

32. The water purifier according to claim 31, wherein the cool water storage tank insulation part has a thickness greater than that of the purified water storage tank insulation part.

33. The water purifier according to claim 26, further comprising a water level sensor to detect a water level of water stored in the storage part, wherein the water level sensor detects the water level using a variation in capacitance based on contact with the water.

34. The water purifier according to claim 33, wherein the water level sensor comprises a plurality of contact parts to contact the water stored in the storage part and having lengths different from each other and a support part supporting the plurality of contact parts.

35. The water purifier according to claim 34, wherein the support part is formed of a plastic material and coupled to the storage part at the outside of the storage part, and the plurality of contact parts pass through the storage part and are disposed within the storage part.

36. The water purifier according to claim 34, wherein the support part is formed of a metal material and coupled to the storage part at the inside of the storage part.

37. The water purifier according to claim 26, wherein the storage part further comprises:
 a discharge part through which water is discharged; and
 a filter part to filter the discharged water when the water stored in the storage part is discharged.

38. The water purifier according to claim 37, wherein the filter part comprises an insertion part inserted into the discharge part and a filter body having at least one hole through which water flows.

39. A water purifier comprising:
 a filter part to filter water;
 a storage part to store the water filtered by the filter part, the storage part comprising a first tank, a second tank, and a connection portion that connects the first and second tanks, wherein the connection portion, the first tank, and the second tank are integrally formed with each other, wherein the first tank includes a first side wall and a first bottom wall extended from the first side wall, the second tank includes a second side wall and a second bottom wall extended from the second side wall, the second side wall is connected to the first bottom wall by the connection portion; and
 a separation unit that partitions a space within the storage part into first and second spaces, wherein the first space has a first capacity and the second space has a second capacity less than the first capacity and the water flows from the first space into the second space;
 wherein the separation unit comprises:
  a first member that contacts water within the first space,
  a second member that contacts water within the second space, and
  an insulation space defined between the first and second members,
 wherein the second member includes a side surface and the side surface comprises:
  a plurality of protrusions protruded from and integrally formed with the side surface, the plurality of protrusions including:
 a plurality of contact parts disposed on each of the plurality of protrusions and contacting the connection portion, and
 a non-contact part which does not contact the connection portion,
 wherein the water that flows can flow directly from the first space into the second space through a passage defined between the non-contact part of the side surface of the second member and the connection portion, and
 wherein the first side wall and the first member define the first space and the second side wall and the second member define the second space.

40. The water purifier according to claim 4, wherein the separation unit further comprises a support part extended downward from the partition part, the support part is inserted in the second space, the support part comprises the side surface including the plurality of protrusions.

41. The water purifier according to claim 40, wherein the plurality of protrusions are spaced from each other along a circumference direction of the support part.

42. The water purifier according to claim 41, wherein a support protrusion is formed on an upper portion of each of the plurality of protrusions, and the support protrusion is seated on the connection portion.

43. The water purifier according to claim 4, wherein an air passage through which air flows is defined in the extension part.

44. The water purifier according to claim 43, further comprising a cover that covers an upper side of the first space, wherein the cover is seated on the extension part to press against the extension part.

45. The water purifier according to claim 44, wherein the cover comprises a press part protruded downward from the cover.

46. The water purifier according to claim 44, wherein the cover covers the air passage in a state the cover covers the first space.

* * * * *